(12) United States Patent
Hansen

(10) Patent No.: US 7,012,706 B1
(45) Date of Patent: Mar. 14, 2006

(54) SYSTEM AND METHOD FOR INTERFACING WITH MULTIPLE PRODUCTION SCANNERS

(75) Inventor: David R. Hansen, Honeoye Falls, NY (US)

(73) Assignee: NexPress Digital LLC, Rochester, NY (US)

( * ) Notice: Subject to any disclaimer, the term of this patent is extended or adjusted under 35 U.S.C. 154(b) by 1237 days.

(21) Appl. No.: 09/686,995

(22) Filed: Oct. 10, 2000

(51) Int. Cl.
*G06K 1/00* (2006.01)
*H04N 1/32* (2006.01)
*G06F 3/00* (2006.01)

(52) U.S. Cl. ............... 358/1.15; 358/1.13; 358/442; 719/328

(58) Field of Classification Search ........... 358/1.13, 358/1.15, 442; 719/328
See application file for complete search history.

(56) References Cited

U.S. PATENT DOCUMENTS 5,764,866 A * 6/1998 Maniwa ............ 358/1.15
6,163,816 A * 12/2000 Anderson et al. ........ 710/8
6,286,054 B1 * 9/2001 Wang ................. 719/321

* cited by examiner

*Primary Examiner*—Edward Coles
*Assistant Examiner*—Houshang Safaipour

(57) ABSTRACT

A system and method for interfacing with production scanners is disclosed. A driver is provided which enables real-time communications between a scanning application and scanner devices. The driver includes an application program interface which is coupled with one or more personality modules, one for each scanner device. The personality module facilitates the command and control of a particular scanner device. The application program interface can communicate with more than one personality module at any given time to enable parallel simultaneous operation of multiple scanner devices. The driver delivers resultant image data from the scans to a commonly accessible buffer where the scanning application can asynchronously retrieve it.

29 Claims, 8 Drawing Sheets

Microfiche Appendix Included
(8 Microfiche, 697 Pages)

SYSTEM AND METHOD FOR INTERFACING WITH MULTIPLE PRODUCTION SCANNERS

RELATED APPLICATIONS

The following co-pending and commonly assigned U.S. Patent Application has been filed on the same date as the present application. This application relates to and further describes other aspects of the embodiments disclosed in the present application and is herein incorporated by reference.

U.S. Pat. application Ser. No. 09/686,850, "SYSTEM AND METHOD FOR INTERFACING WITH A PRODUCTION SCANNER", filed concurrently herewith.

REFERENCE TO MICROFICHE APPENDIX

A microfiche appendix is included of Appendices C, D and E. The total number of microfiche is 8. The total number of frames is 697.

REFERENCE TO APPENDICES

Appendices A and B are included and are printed immediately preceding the claims. In addition, Appendices C, D and E, are also included after the claims as a microfiche appendix.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

While just about every computer user owns their own printer and is capable of producing high quality documents, the ability to produce such documents in high volume and with special finishing features, such as binding, is still within the purview of the commercial print shops and corporate copy departments. High volume, finished production of documents is typically referred to as production printing. A production printer is a printing device capable of rapid production of large volumes of documents. Typically these printers have high paper handling capacity, the ability to draw on multiple media types from multiple sources and the ability to automatically finish a document such as by adding a binding. Despite the automation provided by the production printer and the proliferation of computer technology, especially in the area of desktop publishing, production printing is still a complicated and often manual process.

In a typical print shop, customers bring in original documents which they want turned into a finished product such as a bound booklet, a tri-fold brochure or a tabbed three ring bound notebook. In addition, they typically need a large volume of the finished product, for example, one thousand brochures. The combination of the original documents plus the instructions for producing the finished product is called a "job". The documents can be brought in either in hard copy or electronic form, such as on floppy disk, compact disc or tape or can be transmitted to the print shop over a network such as the Internet.

Documents which are delivered in a hard copy form to the print ship must first be scanned into the shop's computer system so that they can be edited and otherwise prepared for production. Typically, the shop will have a one or more scanning stations consisting of one or more workstation computers coupled with one or more production scanners. As compared to consumer grade scanner devices, production scanners are high volume devices which are capable of scanning a high volume of originals continuously at high speed and at high resolution. While scanners tend to be very accurate and reliable devices, scanning documents can still be very resource intensive especially coupled with the high volume and high speed environment of a production print shop.

In a typical operation, the operator will load a document into the scanner's automated feeder. Next, the operator will load the scanning application into the workstation, if not already loaded, and then instruct the scanner to scan the document. Once the scan is complete, the operator can view the scanned document and verify that a faithful reproduction was made. Often, however, errors occur during the scanning process which may require rescanning. Such errors include operator errors or scanner malfunctions such as dust on the scanning glass, paper mis-feeds or lamp failures. Further, sometimes the parameters of the scan, such as the image processing algorithms, contrast or color balance, need to be adjusted to account for the characteristics of the original document. These adjustments may not be apparent from a visual examination of the original document and may require several re-scans to get the parameters set correctly. For large documents, such rescanning can be time consuming and costly.

The combination of large documents, the print shop's large workload and the inevitable errors that occur requires that the scanning process be as efficient as possible. This typically translates into reducing operator errors and reducing the cost of error recovery and correction. One solution is to provide intelligent and efficient scanning applications for the operator to use on the scanning workstation which anticipate problems and offer intuitive and efficient control of the scanning operations. Unfortunately, such applications are often limited by the hardware and software interfaces to the scanners which fail to provide the necessary control over scanner operation and scanner feedback of status and event data for error detection and correction. Further, these interfaces lack the ability to allow efficient management and operation of multiple scanners or scanners which are located remotely from the scanning workstation, such as in a clean room environment.

Accordingly, there is a need for an efficient system and method for interfacing scanning applications with high volume production scanners.

SUMMARY

The present invention is defined by the following claims, and nothing in this section should be taken as a limitation on those claims. By way of introduction, the preferred embodiments described below relate to a driver for interfacing a first application program to first and second scanners. The first application program is operative to transmit first and second commands to the first and second scanners and the first and second scanners are operative to scan first and second documents and transmit first and second image data and first and second status data from the scans to the first application program. The driver comprises an application program interface ("API") coupled with the first application program and operative to receive the first commands from the first application program. The driver further comprises a first scanner personality module ("SPM") coupled with the API and the first scanner and operative to receive the first image data and the first status data from the first scanner and transmit the first commands to the first scanner and provide the first image data and the first status data to the first application program and a second scanner personality module ("SPM") coupled with the API and the second scanner and operative to receive the second image data and the second status data from the second scanner and transmit the second commands to the second scanner and provide the second image data and the second status data to the first application program and wherein the second SPM is further capable of operating substantially simultaneously with the first SPM. In addition, the API and the first and second SPM's facilitate real time communication between the first application program and the first and second scanners.

The preferred embodiments further relate to a method of interfacing a first application program to first and second scanners, the first application program executing on a first computer coupled with the first and second scanners. The method comprises: initiating a first scan of a first document on the first scanner as directed by the first application program; initiating a second scan of a second document on the second scanner as directed by the first application program, as the first scan progresses; receiving first image data generated by the first scan as the first and second scans progress; receiving first status data from the first scanner as the first and second scans progress; receiving second image data generated by the second scan as the first and second scans progress; receiving second status data from the second scanner as the first and second scans progress; providing the first image data and the first status data to the first application program as the first and second scans progress; providing the second image data and the second status data to the first application program as the first and second scans progress; adjusting the first scan as the first and second scans progress; and adjusting the second scan as the first and second scans progress.

DETAILED DESCRIPTION OF THE PRESENTLY PREFERRED EMBODIMENTS

Figure 1A:
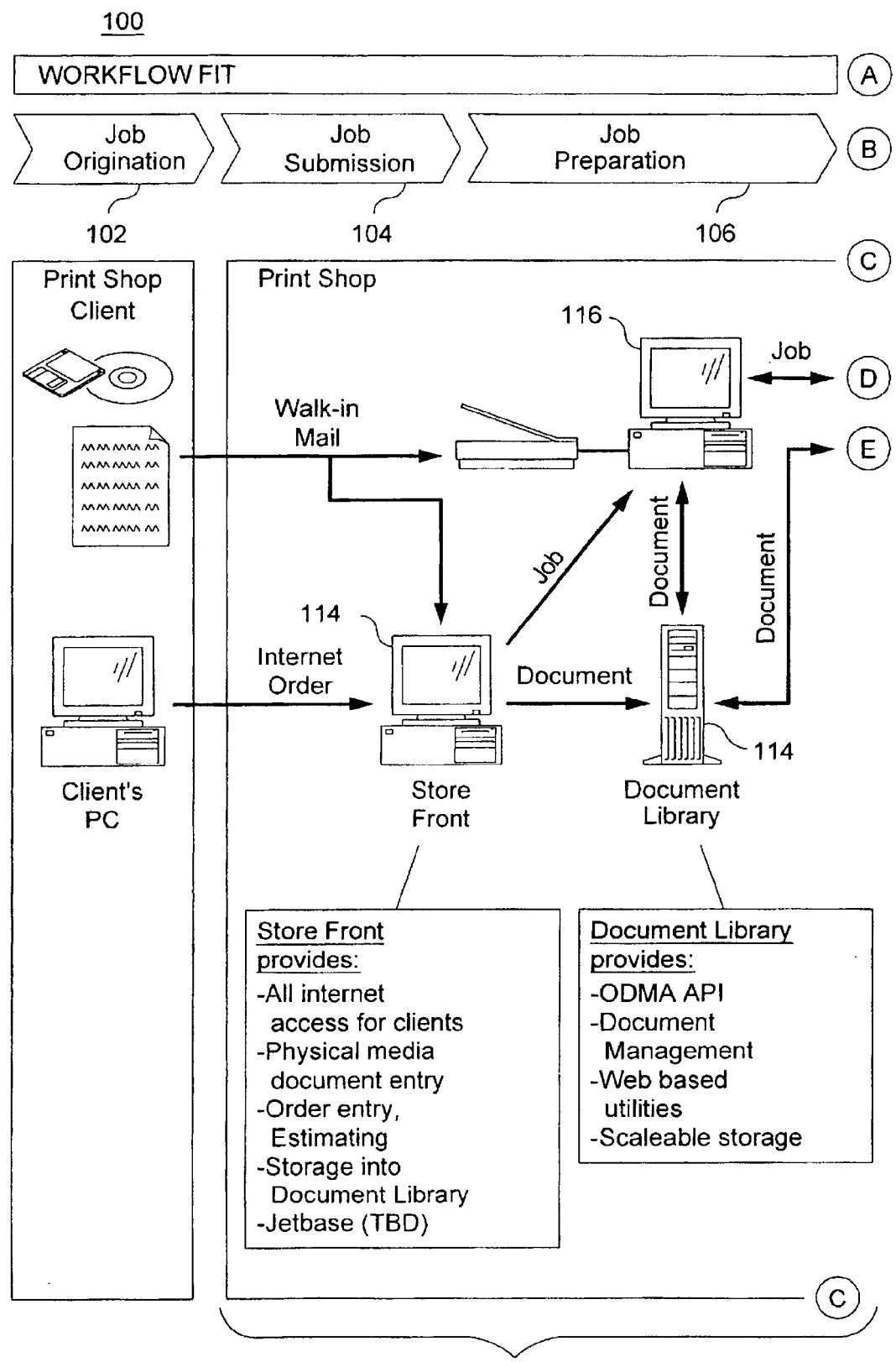
FIG. 1 depicts a flow diagram illustrating a preferred production printing workflow.
Figure 1B:
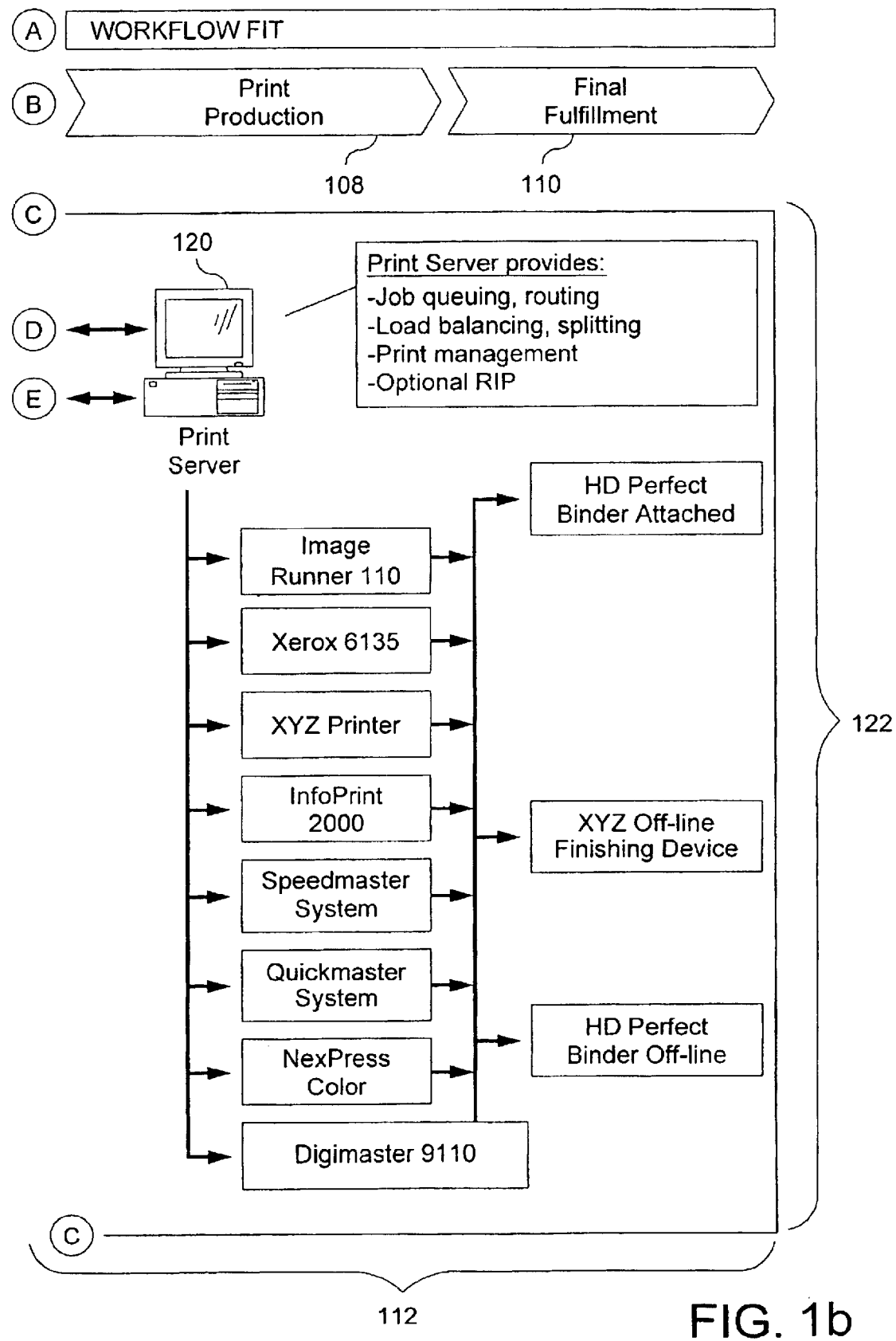

Referring now to FIG. 1, there is shown a flow diagram illustrating the production work flow 100 in a typical production print shop such as a commercial high volume copy or print shop. A workflow is defined as the tasks, procedural steps, organizations or people involved, required input and output information, and tools needed for each step in a business process. As will be discussed below, a workflow approach to analyzing and managing a business or process such as production printing can be combined with an object oriented approach, which tends to focus on the discrete objects and processes involved such as documents, pages, data and databases. For the purposes of this disclosure, the term "object oriented", when applied to the disclosed embodiments, does not imply that an object oriented programming approach is the only method of implementation of the disclosed embodiments.

FIG. 1 further depicts a typical computer network 112 for use in a print shop. In a typical digital print shop, there will be a network 112 of computer work stations 114, 116, servers 118, 120, high volume input device 124, and high volume output devices 122 which make up the computer network 112. The servers 118, 120 include network servers 118 and print servers 120. The topology of the network 112 is typically structured so as to align with the workflow 100 of the print shop. The network 112 may be implemented as a wired or wireless Ethernet network or other form or local area network. Further the network 112 may include wired or wireless connections to wide area networks such as the Internet and connections to other local area networks such as through a virtual private network.

The production workflow 100 includes the procedural stages of job origination 102, job submission 104, job preparation 106, print production 108 and final fulfillment 110. Alternatively, one or more of these procedural stages may be combined as well as there may be other additional procedural stages. Job origination 102 is the procedural stage of receiving the documents and instructions, which together are defined as a "job", from the customer. Job origination 102 can occur when a customer physically brings his job, whether in hard copy or electronic form, to the print shop or otherwise transmits the job to the print shop, whether by phone, fax, postal mail, electronic mail or over a local area or wide area network such as over the Internet. Note that a job may contain more than one document and more than one set of instructions. For example, a job may contain many documents, each being one chapter of a book, along with a document containing a cover for the book. This exemplary job may include the instructions for producing the body of the book from the individual chapter documents and another set of instructions for producing the cover. In addition, as will be discussed below, there may be a third set of instructions for assembling the cover to the body of the book.

Job submission 104 is the receipt of the job by the print shop and the entering of the job into the print shops production system or workflow. Typically the instructions from the customer will be written down on a special form, known as a "ticket" or "job ticket". A ticket may also be electronically created and maintained. Furthermore, pre-defined tickets may be available for standardized instructions. For example, the shop may have a pad of pre-printed tickets with the instructions to duplicate the documents, three hole punch the final output and assemble the punched final output in a three ring binder. If this is a common request by customers, such pre-printed tickets can save time and resources. All the order taking clerk need do is fill in any customer specific details such as the number of copies to produce. Pre-defined tickets may help to standardize operations and prevent errors in the transcription of instructions from the customer. In very simple print shops, job submission 104 may simply be the receiving of the original documents and instructions along with the creation of a ticket, placing the job in a paper folder and setting it in a physical queue for later handling in subsequent procedural stages.

In print shops which handle jobs electronically, job submission 104 requires entering the job into the shops electronic production system. For documents which are brought in by the customer as hard copy, the documents must first be scanned electronically into the shop's computer system. For documents delivered in electronic form, the document data files must be loaded on the shop's computer system.

For the job submission stage 104, the computer network 112 will include one or more "store front" workstations 114. The store front workstations 114 are computer systems placed at the order taking desk, at a manned clerk's station or set out for customer self service use. These workstations 114 are used for the job submission stage 104 and typically will be configured to handle many different electronic media types such as floppy disk, compact disc, tape, etc. These stations 114 may also be configured to receive jobs over the Internet or other form of network connection with customers. Further, these workstations 114 are typically configured to read many different electronic file formats such as those used by the Microsoft Office™ family of products manufactured by Microsoft Corporation, located in Redmond, Wash. or various other desktop publishing program file formats such as Aldus Pagemaker™ or QuarkXpress™. In addition, these stations 114 can also read "ready for printer" file formats, which will be discussed later, such as Portable Document Format™ ("PDF"), Postscript™ ("PS") or printer control language ("PCL"). Job preparation workstations 116 can also accept image formats such as Tagged Image File Format ("TIFF"), bitmap ("BMP") and PCX. These stations 114 may also include a scanner 124 for scanning hard copies of documents into the computer system. Scanners typically are complicated devices to operate and some print shops may prefer to locate the scanners 124 in the job preparation stage 106 coupled with the job preparation workstations 116 (as shown in the figure) for use solely by trained personnel as will be discussed below. In addition, the store front computers 114 also provide the ability to generate a ticket, electronically or in hard copy form, for the job containing all of the instructions for completing the production printing task. This process of generating the ticket may be automated, involving pre-defined tickets, manual or a combination thereof.

Job preparation 106 involves preparing the documents for printing according to the instructions in the ticket. For documents that are submitted in hard copy form, job preparation 106 may include scanning the documents and creating a faithful and error free electronic reproduction. The documents, once in electronic form, must also be distilled down or converted into a common file format that the print shop can use to both edit and print the documents. This alleviates the need for operators to deal with multiple different programs and eliminates the need to assemble complex documents together for printing using different electronic file formats.

For example, a customer may bring in two different documents, one being the body of a book and the other being the photographs to be inserted at specific pages. The customer may then instruct that the photographs be inserted at particular pages and that the final assembly have continuous page numbers added. The body of the book may be in Microsoft Word™ format while the images of the photographs are in Adobe Photoshop™ format. While the operator could figure out at which pages the images will be inserted and appropriately number the pages of the book and photographs using each individual software package, this is a very complex and time consuming process. It also requires that the operator be trained and familiar with a range of software packages and runs the risk that he will not be familiar with the particular package that the customer used.

Therefore, it is more efficient to distill each of the various file formats into a unified format which allows the operator to prepare the job using a single software interface. In the preferred embodiments, all documents, whether provided in hard copy or electronically, are distilled or converted into a "ready for printer" or "print ready" file format. In the preferred embodiments, the Portable Document Format™ is used as the ready for printer format, developed by Adobe Systems, Inc., located in San Jose, Calif.

A ready for printer file format is defined as a file format which contains both the data to be printed along with printer control instructions that can be directly interpreted by the internal processing engine of a printer or other form of hard copy output device in order to rasterize the data image onto the output media. Rasterization is the placement of image data at a specific location on the output media. Such file formats include Portable Document Format™ ("PDF") and Postscript™ ("PS") both manufactured by Adobe Systems, Inc., located in San Jose, Calif., as well as printer control language ("PCL"), manufactured by Hewlett Packard, located in Palo Alto, Calif. Examples of non-ready for printer formats include the native application file formats for personal computer application programs such as Microsoft Word™. These file formats must be first converted to a ready for printer file format before they can be printed. Furthermore, some image file formats, such as the Tagged Image File Format ("TIFF") contain bit image data only which is already in a format which specifies its output location on the output media and does not contain printer control instructions for interpretation by the internal processing engine of the printer and therefore, for the purposes of this disclosure, is not a ready for printer file format. By using a ready for printer format, rasterization of the image data can be delayed as close as possible to the final placement of the image data on the output media. This allows the most efficient use of the production print device 122 by allowing its internal control logic to optimize the rasterization process resulting in output that is more likely to match with the operator's expectations.

For the job preparation stage 106, the computer network 106 includes job preparation workstations 116, scanners 124 and network servers 118 coupled with the store front workstations 114 over the network 112. Herein, the phrase "coupled with" is defined to mean directly connected to or indirectly connected with through one or more intermediate components. Such intermediate components may include both hardware and software based components. The job preparation workstations 116 preferably execute workflow management software which allows the operator to manage, edit and print jobs. The network server(s) 118 includes a document library which allows manipulation, management, storage and archiving of jobs, or just there respective documents and/or tickets, as well as facilitates and manages the flow of jobs from the store front computers 114 to the job preparation workstations 116 and from the job preparation workstations 116 to the print servers 120 or the production output devices 122. Exemplary document libraries include Intra.Doc™ document management system manufactured by Intranet Solutions, Inc., located in Eden Prairie, Minn. and the DOCFusion document management system manufactured by Hummingbird, Inc., located in York, Ontario, Canada. In the preferred embodiment, the job preparation workstations 116 are Imagesmart™ Workstations, manufactured by Heidelberg Digital, L.L.C., located in Rochester, N.Y. Alternatively, an appropriate computer hardware platform such as that comprising a Pentium™ class processor or better, manufactured by Intel Corporation, located in Santa Clara, Calif., 64 megabytes of RAM or more, a 20 gigabyte hard disk or larger and appropriate display device may be used. Further, in the preferred embodiment, the network servers 118 preferably comply with the Open Document Management Architecture ("ODMA") standard and provide document management capabilities and scaleable storage.

The job preparation workstations 116 also provide the capability of the print shop to add value to the print production process by offering services to the customer. Such services include the ability to modify documents provided by the customer to add features that the customer could not or would not add himself. Such features include adding page numbers across multiple documents, bates numbering, adjusting page layout for tab stock and aligning the output to account for binding. Further the job preparation workstations 116 provide the capability to fix errors in the documents such as removing artifacts in scanned images and masking over unwanted text or markings. The job preparation workstations 116 can also be used to prevent inaccuracies in the finished output caused by the printing or binding process. Such inaccuracies include binder's creep which happens after a document is imposed into a booklet/pamphlet using a signature imposition. Binder's creep occurs when the placement of the images on the paper fails to account for the thickness of the binding as a function of the number of pages in the book causing the image on the pages to shift inward as you get closer to the cover. Binder's creep is prevented by shifting image slightly when performing the signature imposition on the document. In addition, the job preparation workstation 116 allows the operator to manage and layout the document pages for final output, also known as "imposition" and "signature imposition". In addition, the operator can shuffle pages, reverse pages, insert blank pages, trim and shift pages, create bleeds and place multiple pages on a sheet, also known as "n-up" to create proof sets, brochures or pamphlets, etc. Further the job preparation workstation 116 permits the operator to add annotations to the document such as bates numbers, page numbers, logos and watermarks. All of these service add value to the final output. Formatting and other modifications to the document can be globally applied to the entire document, such as a shifted margin or may be applied only to select pages. Such alterations to the document are known as document/page features or attributes. Further, these alterations are also known as document or page exceptions since they typically override specific instances of the original document formatting as set by the customer.

The next stage in the print production workflow 100 is the print production stage 108. In the print production stage 108, the final form of the documents for printing is sent to a print server 120 which will distribute the job to the final output device 122. In manual print shops, this stage 108 would be similar to an operator manually taking the ready for production job over to the desired output device 122 to start the job. The print production stage 108 manages the output resources of the print shop. Such management includes queuing jobs to the proper devices 122 in the shop, routing jobs to available devices 122, balancing the load placed on the various devices 122, and pre-processing jobs, such as splitting or RIP'ing the job, prior to sending it to a particular device 122. RIP stands for Raster Image Processor and is the hardware and/or software which converts ready for printer data into raster images. It is also a common term for rasterizing a page image on to the output media.

The print server 120 used in the print production stage 108 is coupled with the job preparation workstations 116 and the network server 118 over the network 112. Further, the print server 120 is coupled with the various output devices 122 in the print shop. Note that some output devices 122 may not support electronic transfer of the data to be output and may require a manual step for operation. Such devices may include a special binding machine which requires that the partially finished documents be manually transferred to the binding machine to complete the production. The print server 120 is preferably implemented as a separate computer coupled with the network 112, however, software based print servers running on a network server 118, job preparation workstation 116 or store front workstation 114 may also be used. In the preferred embodiment, the printer server 120 includes an independent computer workstation, typically running a UNIX or Windows NT operating system, a software print server engine and a software print server application. The print server application offers the user interface ability to configure and manage the print server operation. The print server engine performs the automated processes of the print server. These processes include spooling and queuing jobs and job content (i.e. the document), directing the jobs to specific production output devices based on the attributes of the print job and how these attributes are satisfied by the print engine, load balancing jobs among the various production output devices to keep all printers fully utilized, e.g. to split color from black and white jobs, and acting as a communication gateway where it can accept multiple input communication and print protocols translating them to the communication and print protocol the production output device 122 understands.

The final stage of the production printing workflow 100 is the final fulfillment stage 110. The final fulfillment stage 110 is the stage where the finished output is produced on the production output device 122. A production output device is a computer output device, such as a printer, designed for high volume production of printed documents. Such devices preferably include the ability to produce large quantities of documents with mixed media types and various degrees of finishing, such as stapling or binding, at very high speed. Exemplary output devices include the Digimaster™ Digital High Volume Printer manufactured by Heidelberg Digital, L.L.C., located in Rochester, N.Y. and the NexPress™ Color printer manufactured by NexPress, Corporation, located in Rochester, N.Y.

Figure 2:
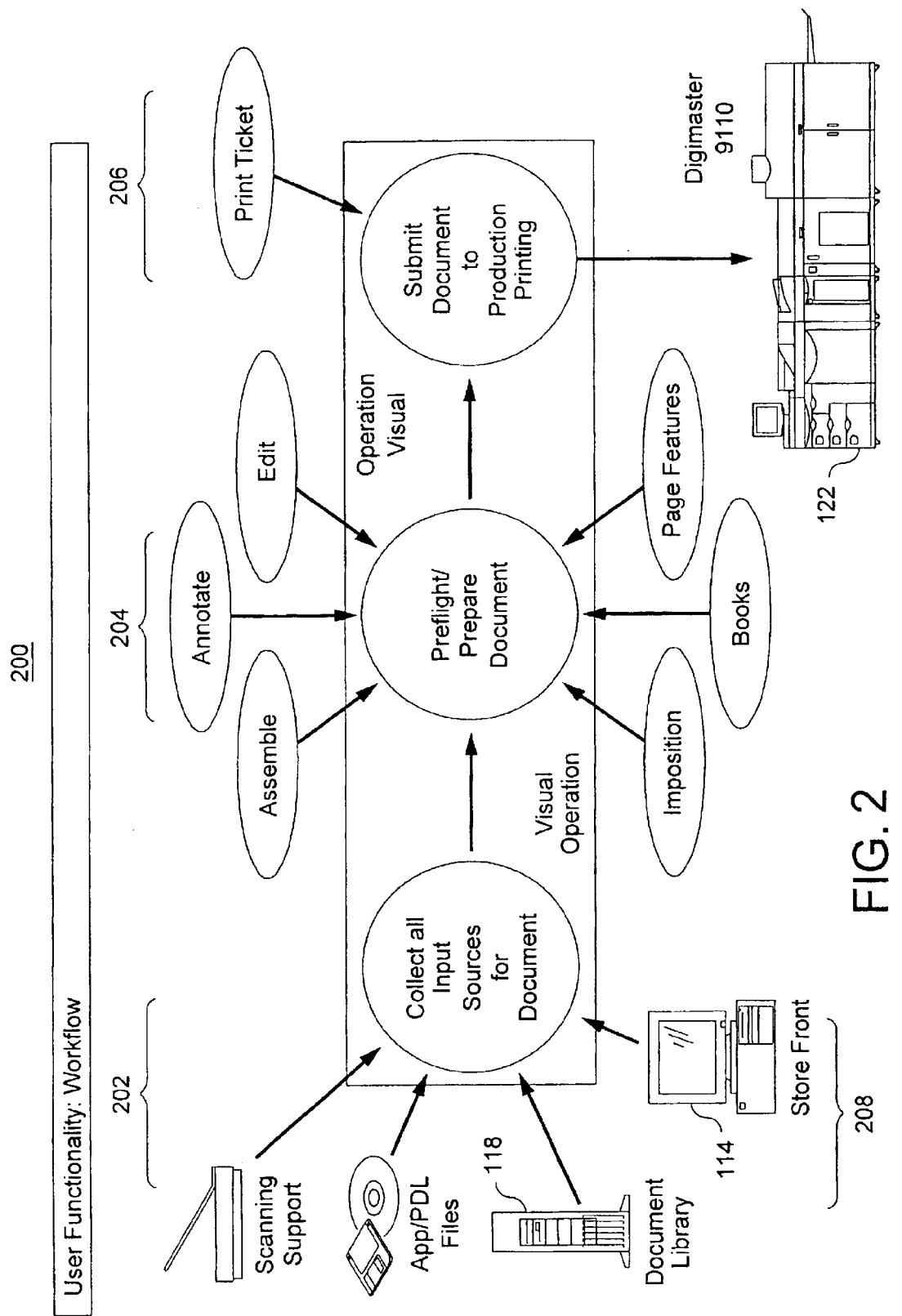
FIG. 2 depicts a flow diagram showing the user functionality workflow of the preferred embodiment

Referring now to FIG. 2, there is shown a flow diagram showing the user functionality workflow 200 of the preferred embodiment job submission and preparation stages 104, 106. The user workflow 200 includes an input source stage 202, a preflight stage 204 and a production stage 206. In the input source stage 202, all of the documents of the job are collected together from the different input sources 208. As detailed above, all of the collected documents are converted to a ready for printer format, preferably a Portable Document Format™. This conversion can be a manual or automated process or a combination thereof. For example, a special directory can be created on the network server 118 where data files in various file formats can be placed, for example, by the clerk who accepts the documents from the customer and inputs them into the store front workstation 114. Automated logic which watches this directory, will see the placement of files and automatically convert them (or flag them for manual conversion) into a ready for printer format. Any documents which the automated logic cannot handle can be flagged for manual conversion. The converted documents are then passed to preflight stage 204 where they are prepared for production. This transfer of converted documents can occur by moving the documents to a special directory on the network server 118 where they can be accessed by the job preparation workstations 116 or by transmitting the documents to the job preparation workstation 116. This process can be manual or automated and may involve placing the documents in a queue of documents waiting to be prepared for production. Further, this process may include a manual or automated determination of the capabilities, skill level or training level of the various operators currently logged into the available job preparation workstations 116 as well as the current load/backlog of job in their respective queues. Taking these factors into account, job can be automatically or manually routed to the operator best able to handle the job both technically and in an expedient manner. This functionality can be implemented by creating an operator database which tracks the capabilities, skill level and training level of the various operators who work in the print shop. This database can be coupled with queue management software which balances the loads/backlogs of job at each station 116.

In the preflight stage 204, the documents can be assembled, such as in a book, annotated, edited, and have imposition or other page features applied. Once the documents are prepared for production, they are passed to the production stage 206. In the production stage 206, the prepared documents along with the production instructions (from the tickets) are submitted to the print server or directly to the production output device 122 using a file downloader such as the Print File Downloader™ application program manufactured by Heidelberg Digital, L.L.C., located in Rochester, N.Y. This user functionality workflow 116 may be implemented as a combination of hardware, software and manually executed components and may involve one or more of the components detailed in the production printing workflow above.

For more information on the production printing workflow, see U.S. Pat. application Ser. No. 09/573,368, entitled "SYSTEM AND METHOD FOR REPRESENTING AND MANAGING PAGES IN A PRODUCTION PRINTING WORKFLOW", filed May 17, 2000, U.S. Pat. application Ser. No. 09/573,026, entitled "SYSTEM AND METHOD FOR REPRESENTING AND CONTROLLING A PRODUCTION PRINTING WORKFLOW", filed May 17, 2000, now U.S. Pat. No. 6,411,314, U.S. Pat. application Ser. No. 09/572,108, entitled "EFFICIENT USE OF PRINT RESOURCES WITHIN A JOB STREAM", filed May 17, 2000, now U.S. Pat. No.6,407,520, U.S. Pat. application Ser. No. 09/572,341, entitled "SYSTEM AND METHOD FOR IMPLEMENTING COMPOUND DOCUMENTS IN A PRODUCTION PRINTING WORKFLOW", filed May 17, 2000, U.S. Pat. application Ser. No. 09/573,093, entitled "SYSTEM AND METHOD FOR VISUAL REPRESENTATION OF PAGES IN A PRODUCTION PRINTING WORKFLOW", filed May 17, 2000, now U.S. Pat. No. 6,462,756, and U.S. Pat. application Ser. No. 09/572,478, entitled "INTERACTIVE HARDCOPY RE-SAMPLING WITHOUT RE-SCANNING", filed May 17, 2000, now U.S. Pat. No. 6,437,575.

When a job is brought into the print shop in hard copy form, it must first be scanned into the shop's computer system as described above. The scanning takes place in the job submission 104 or the job preparation 106 stages of the shop's workflow. Typically, the document is loaded into an automated paper feeder of a production/high volume scanner 124 which is coupled with the job preparation workstations 116 (the "scanner host" or "scanner host workstation"). In the preferred embodiment, the production scanner 124 is an ImageDirect Scanner, manufactured by Heidelberg Digital, L.L.C., located in Rochester, N.Y. The operator then initiates and controls the scan from the job preparation workstation 116 coupled with the scanner 124. The operator interacts with the scanner 124 using a scanning application program loaded on the job preparation workstation 116. The scanning application provides the ability to set the scanner parameters, initiate and control scans and view the results of the scan. The scanning application is typically a computer program written by a third party company different from the manufacturer of the scanner 124 or the job preparation workstation 116, one example is Adobe Systems, Inc., located in San Jose, Calif.

As is known in the art, application programs executing on a computer workstation interface with external hardware devices coupled with that workstation using interface programs called drivers. A driver acts like a translator between the device and programs that use the device. Each device coupled with a computer typically has its own set of specialized commands that only its driver knows. In contrast, most application programs only know how to access these devices by using generic commands. The driver, therefore, accepts generic commands from an application program and then translates them into specialized commands for the device. Essentially, the path between the operating system and virtually all hardware not located directly on the computer's motherboard goes through these special driver programs. Much of a driver's function is as translator between the electrical signals of the hardware sub-systems and the high-level programming languages of the operating system and application programs. For example, drivers take data that the operating system has defined as a file and translates them into streams of bits placed in specific locations on storage devices, or a series of laser pulses in a printer. Because there are such wide differences in the types of hardware controlled through drivers, there are necessarily differences in the way that the driver programs function, however most drivers are executed when the device is required, and function much the same as any other process. The operating system will frequently assign high priority memory blocks to drivers so that the hardware resource can be released and readied for further use as quickly as possible. One reason that drivers are separate from the operating system is so that new functions can be added to the driver-and thus to the hardware subsystems-without requiring the operating system itself to be modified, recompiled and redistributed. Through the development of new hardware device drivers, such development often performed or paid for by the manufacturer of the subsystems rather than the publisher of the operating system, input/output capabilities of the overall system can be greatly enhanced.

An exemplary driver program is a printer driver which allows an application program to print output on a printer coupled with the workstation, whether directly or indirectly, such as over a network. Different printers manufactured by different companies typically offer different features and utilize different commands which are proprietary to that company. As explained above, a driver program allows a layer of abstraction between an application program and the variety of available printers so that the application program does not need to maintain its own ability to utilize all of the different printers that are available or be upgraded to handle later developed devices. The driver provides a standard software interface for the application program to interact with, typically referred to as an Application Program Interface or API. The driver then translates those generic interactions into the device specific commands to control the attached device. In addition, drivers can also present a user interface for controlling vendor specific functions of the particular device. For example, a printer that supports duplexing can be interfaced with using a driver that can present a user interface allowing the operator to choose the duplexing function. Further, the driver is also programmed to control the specific hardware interface that connects the device to the workstation. Such hardware interfaces include Small Computer System Interface ("SCSI"), Universal Serial Bus ("USB"), serial, parallel, and IEEE 1394 ("FireWire") as are known in the art. If a different device is attached, a user need only load a new driver to allow the application program to interact with the new hardware. Scanners 124 are typically physically coupled with the job preparation workstations 116 utilizing a SCSI interface.

Scanner drivers are typically of two types, TWAIN, as defined by the TWAIN group located in Boulder Creek, Calif. and the Image and Scanner Interface Specification ("ISIS") developed by Pixel Translations, Inc., located in San Jose, Calif. and also specified via American National Standards Institute specification ANSI/AIIM MS61-1996. While TWAIN and ISIS based drivers provide the basic functionality required for low volume scanning, they typically prove inadequate for the needs of production/high volume scanning as is done in a production print shop. Such needs include the abilities to scan multiple high volume originals, continuously at high resolution and high speed coupled with efficient error detection, correction and diagnostic capabilities. Further, print shops often need to simultaneously operate multiple scanners 124 manufactured by different manufacturers in an efficient manner and with a minimum of resources. This usually requires that multiple scanners 124 be connected to and operated from one job preparation workstation 116 by a sole operator.

Drivers written under the TWAIN specification are job oriented. A job is defined as a collection of all of the scanning attributes, e.g. the scanning and image processing attributes such as image resolution and bit depth, all of the constant/scanner-independent attributes such as paper plex (simplex or duplex) and attributes specific to the particular scanner such as bar code reading capability. TWAIN drivers set up all of the job parameters and then initiate the scan. Once initiated, however, the parameters cannot be altered until the scan is completed or halted. Therefore, if a parameter is set incorrectly, the scan needs to be stopped and completely restarted. This can be problematic if, for example, a scan error occurs on the 10th page of a 100 page document. In this example, the scan must be allowed to complete before the scanner 124 can be adjusted to account for the error or the scan must be stopped, re-loaded and re-started, incurring significant delay in either case.

Further, TWAIN based drivers deliver the scanned document one image at a time from the scanner hardware interface to the scanning application. This means that the driver must handshake each image (i.e. interrupt the application, establish a connection and deliver the data) to the application program from the hardware interface of the scanner. This creates unnecessary overhead for the application program, especially in high volume environments and in cases where a single scanning application is being utilized to manage multiple scanners 124 which are simultaneously scanning. In addition, while TWAIN drivers support the connection of multiple scanners to the same workstation, they do not support multiple scanners being operated simultaneously from the same workstation. The operator must choose one particular scanner 124 to use for scanning at any given time and wait for that scan to complete before choosing a different scanner 124.

ISIS drivers are device/scanner specific drivers and do not provide a user interface to the scanner. Instead, ISIS drivers require that the application program provide the user interface to the scanner. Further, the ISIS standard fails to provide a comprehensive method of defining scanner jobs like the TWAIN standard does through its extensive use of user specifiable attributes. ISIS interfaces do not provide the ability to display a scanner specific user interface, like TWAIN drivers do, in order for the user to setup the scanner job. The ISIS approach is to require the application to provide all of the user interface software. This approach is functional in the case of a scanning application that needs to be able to work with multiple types of scanners 124 while providing a coherent user interface in the use of those scanners 124. ISIS is not as robust as TWAIN in providing a comprehensive method to define the scanner job. Often the scanner vendor needs to request enhancements to the application program interface ("API") of ISIS in order to perform the functionality required. Further, after the application performs the necessary interaction with the ISIS API to start the scanning process for a set of original documents loaded in the scanner's 124 automatic sheet feeder, the ISIS driver consumes all of the computing power of the host computer until the entire document has been scanned in. Finally, ISIS based drivers do not support multiple scanners being operated simultaneously from the same workstation. Applications written for ISIS drivers assume that only one driver is loaded on the host computer.

Both TWAIN and ISIS based drivers further lack the ability to supply real-time information back to the scanning host workstation computer. Such real time information or status data includes status information such as lamp temperature and scanner parameter settings. Status data further includes information about scanning events such as a paper mis-feed or lamp-failures. By real time, it is meant that status data can be provided back to the scanning application while the scan is progressing and without waiting until the scan completes. Real time is a level of computer responsiveness that a user senses as sufficiently immediate or that enables the computer to keep up with some external process (for example, to present visualizations of the weather as it constantly changes).

The present embodiments describe an improved scanner interface solution for application developers referred to herein as a Virtual Scanner Driver or VSD. The preferred embodiments comprise the ability to have a single application communicate with a single API independent of the brand of scanner 124 which is coupled with the job preparation workstation 116. Further, a personality module or PM is provided which encompasses the vendor specific functionality of the particular scanner 124 coupled with the job preparation workstation 124. The PM interfaces the VSD API to the scanner 124. The PM accommodates three aspects of scanning: the communications method to the scanner 124 (USB, SCSI, serial, parallel, FireWire, etc.), the delivery method of the image data and status data coming from the scanner 124 and any enhanced image processing required over and above that provided by the scanner 124 itself.

By providing a PM loaded on the job preparation workstation 116 for each type of scanner 124 coupled with the workstation 116, the VSD can automatically utilize the appropriate PM when instructed to initiate a scan on a particular scanner 124 by the scanning application. The VSD dynamically chooses which PM to use based on the scanner 124 chosen by the operator.

Further, the VSD and PM facilitate, or enable, real time communications between the scanner 124 and the workstation 116, i.e. the VSD and PM enable the scanner 124 to send image and/or status data to the workstation 116 and the workstation 116 to send commands to the scanner 124 while a scan is in progress on the scanner 124. For example, the VSD provides real-time feedback of scanner 124 status data, including scanner status, events and other telemetry data provided by the scanner 124. This information is provided while a scan is in progress and once the scan completes. This information can be used by the operator to adjust the scan parameters while the scan is progressing without the need to halt or restart the scan. This is useful when the scan quality is slowly degrading but not yet at a point where the scan job is compromised. In such situations, a real-time adjustment, i.e., a command from the workstation 116, can improve the scan quality and eliminate the degradation without the delay of halting and/or restarting the scan. Further, applications such as diagnostic applications can utilize the real-time feedback provided by the VSD to detect impending hardware failures such lamp failures. Automated scan quality applications can monitor the quality of scans in progress and automatically adjust various scanner parameters and image processing algorithms to correct for degradation in quality such as dust on the scanner glass or skewed images caused by a mis-fed original. Such applications can further automate the scanning process and reduce operator errors, thereby improving efficiency and throughput.

In addition, the VSD delivers image data to the scanning application without handshaking each image to the application. In the preferred embodiments, image data, typically consisting of individual image files for each scanned page of a document, is delivered to a buffer storage commonly accessible to the VSD and the scanning application, preferably located within the job preparation workstations 116 file system. This buffer storage can be located in random access memory, on a local hard disk or on a network disk. In the preferred embodiments, the VSD utilizes a Uniform Resource Locator as specified by the Hypertext Transfer Protocol, to provide a uniform and universal file based delivery method which is independent of the device hardware coupled with the job preparation workstation 116. It will be appreciated that other file delivery protocols can also be used including File Transfer Protocol ("FTP" and "TFTP") and Network File System ("NFS") as are known in the art. By delivering the image data to a buffer storage, the scanning application can retrieve the image data asynchronously when it needs the data. This allows the scanning application to efficiently operate and support the simultaneous operation of multiple scanners from the same scanning application and job preparation workstation 116. Further, this allows the VSD to execute the delivery of image data at substantially the same speed as the rated speed of the scanner 124 even when multiple scanners 124 are operating. In the case of the preferred scanner, the ImageDirect scanner, this rate is 65 pages per minute.

Figure 3:
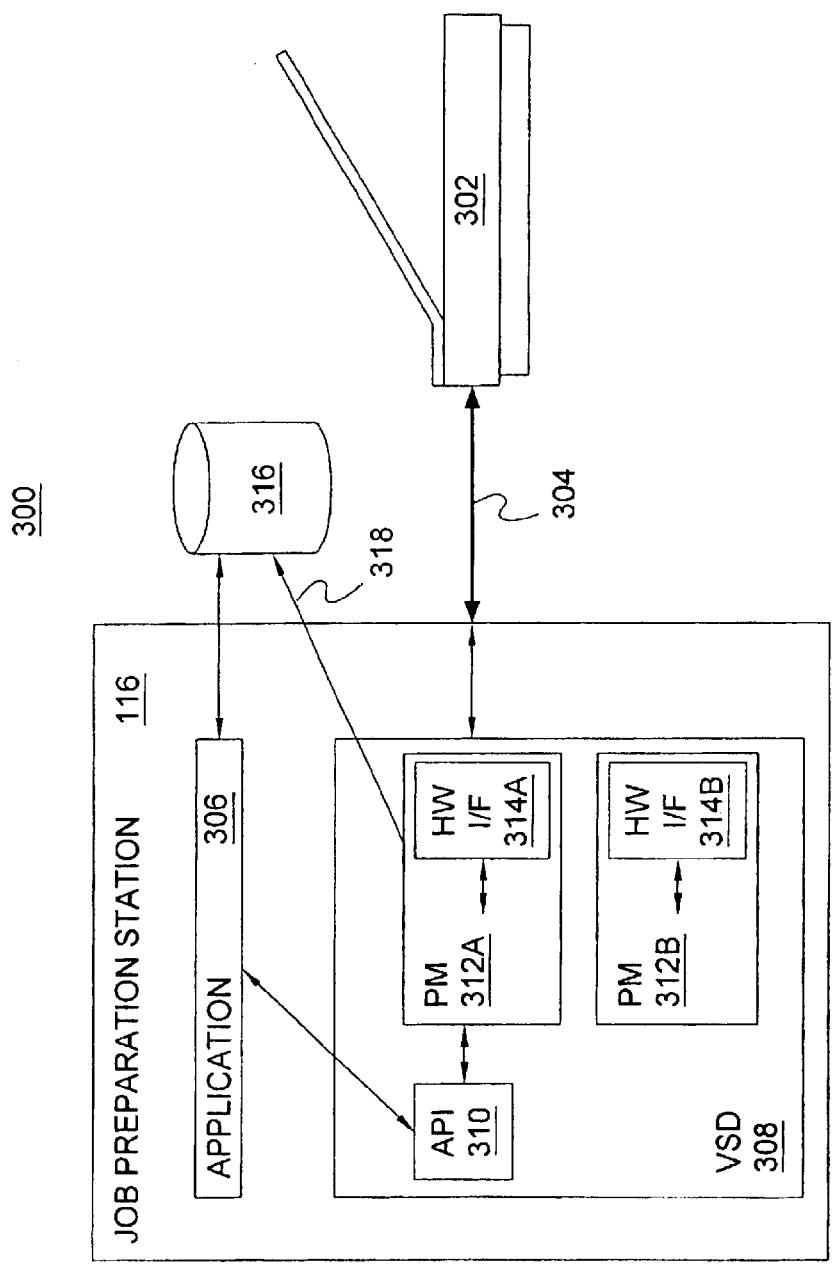
FIG. 3 depicts a block diagram of a scanner interface according to a first embodiment.

Referring now to FIG. 3 there is shown a block diagram of a production scanning system utilizing a first embodiment of a VSD 308. The system 300 includes a job preparation workstation 116, a scanner 302, a scanning application 306 and a buffer storage 316. The job preparation workstation 116 is preferably a Scan Host™ Station as used by the Digimaster™ 9110, manufactured by Heidelberg Digital, L.L.C., located in Rochester, N.Y. Alternatively, an appropriate computer hardware platform such as that comprising a Pentium™class processor or better, manufactured by Intel Corporation, located in Santa Clara, Calif., 64 megabytes of RAM or more, a 20 gigabyte hard disk or larger and appropriate display device may be used. Further the scanner 302 is preferably an ImageDirect Scanner also manufactured by Heidelberg Digital L.L.C. The scanner 302 is coupled with the job preparation workstation 116 using a hardware interface 304. The hardware interface 304 is preferably a SCSI interface. Alternatively, the hardware interface 304 can be a USB, FireWire, serial or parallel interface. Further, the scanner 302 can be coupled with the job preparation workstation 116 via a network utilizing an Ethernet or other comparable network interface/architecture as is known in the art. Preferably, the hardware interface 304 supports high bandwidth, high throughput bi-directional communications. The buffer storage 316 is preferably a hard disk drive coupled with the job preparation workstation's 116 file system, and preferably physically connected with the station 116. In alternative embodiments, the buffer storage 306 may be a random access memory, a dedicated hard drive coupled with the scanner 302 or a remote disk drive such as a network drive. It is preferred that the operating system of the job preparation workstation 116 allow common access to the buffer storage 316 from both the scanning application 306 and the VSD 308.

The scanning application 306 is a software program executing on the job preparation workstation 116 which allows an operator to initiate and control scan jobs as well as view and manipulate the results of the scans, such as editing the resultant images, or by sending the results to a production printer 122. In the preferred embodiments, the scanning application 306 is the Scan Host ™ software as used by the Digimaster 9110, manufactured by Heidelberg Digital, L.L.C., located in Rochester, N.Y. The system 300 further includes the VSD 308 which is coupled with the scanning application 306. The scanning application 306 communicates with the VSD 308 via the VSD's 308 API 310 as is known in the art. The API 310 provides a coherent uniform user interface to the various scanners 302 that can be used by the scanning application 306. This API 310 is described in more detail in Appendix A. The VSD 308 further includes one or more PM's 312A, B. A PM 312A, B is defined for each of the scanners 302 which are connected or capable of being connected with the job preparation workstation 116. The PM 312A, B bridges the interface gap between the API 310 and the hardware interface 304 to the scanner 302. The PM 312A, B encompasses the scanner specific attributes of the particular scanner 302 and translates the generic commands from the API 310 into the specific commands which the scanner 302 understands. Further, the PM 312A, B includes the hardware interface connectivity 314A, B which formats and transmits those commands over the particular hardware interface 304 used to connect the scanner 302 to the job preparation workstation 116. The PM 312A, B accommodates the communications interface to the scanner device 302 so the scanning application 306 does not have to deal with this aspect. This includes initializing and maintaining the communications. As described above, the communication's interface can a SCSI, FireWire, Fibre Channel, USB, Serial or Parallel, etc. type interface. The PM 312A, B further provides a direct interface 318 to the buffer storage 316. This allows the PM 312A, B to deliver image data from the scanner 302 to the buffer storage 316 where the scanning application 306 can asynchronously retrieve it. The PM 312A, B is responsible for delivering the scanned image data to the destination buffer storage 316 which may be located locally on the job preparation station 116 or remotely, such as on a network drive. To enable image data delivery to a remote buffer storage 316, the PM 312A, B may employ some form of file system protocol such as FTP or NFS or other protocol such as HTTP as described above. Finally, the PM 312A, B identifies and provides image processing features that may not be supported (are not native) on the scanner device 302 itself. Where a particular image processing feature is not available on the scanner 302, the PM 312A, B provides a software substitute. In this way, the VSD 308 can present a uniform feature set to the scanning application 306 and is not limited by the actual available feature set of the scanner 302. The preferred scanner interface implemented by a PM 312A, B is described in more detail in Appendix C. In this way, the VSD 308 is logically partitioned into the common API 310 which interfaces to the scanning applications 306 and the PM 312A, B which embodies scanner/vendor specific interface attributes. Further, as was discussed above, the API 310 is capable of receiving commands from the scanning application 306 and passing them on to the PM 312A, B, and the PM 312A, B is capable of passing those commands onto the scanner 302 while a scan is in progress and while image or status data is being transferred from the scanner 302 to the PM 312A, B which transmits it to the buffer storage 316 for later retrieval by the scanning application 306, thereby facilitating/enabling real time communication between the scanner 302 and the scanning application 306/workstation 116. For more detail on the software architecture of the VSD 308, refer to Appendix B.

Figure 4:
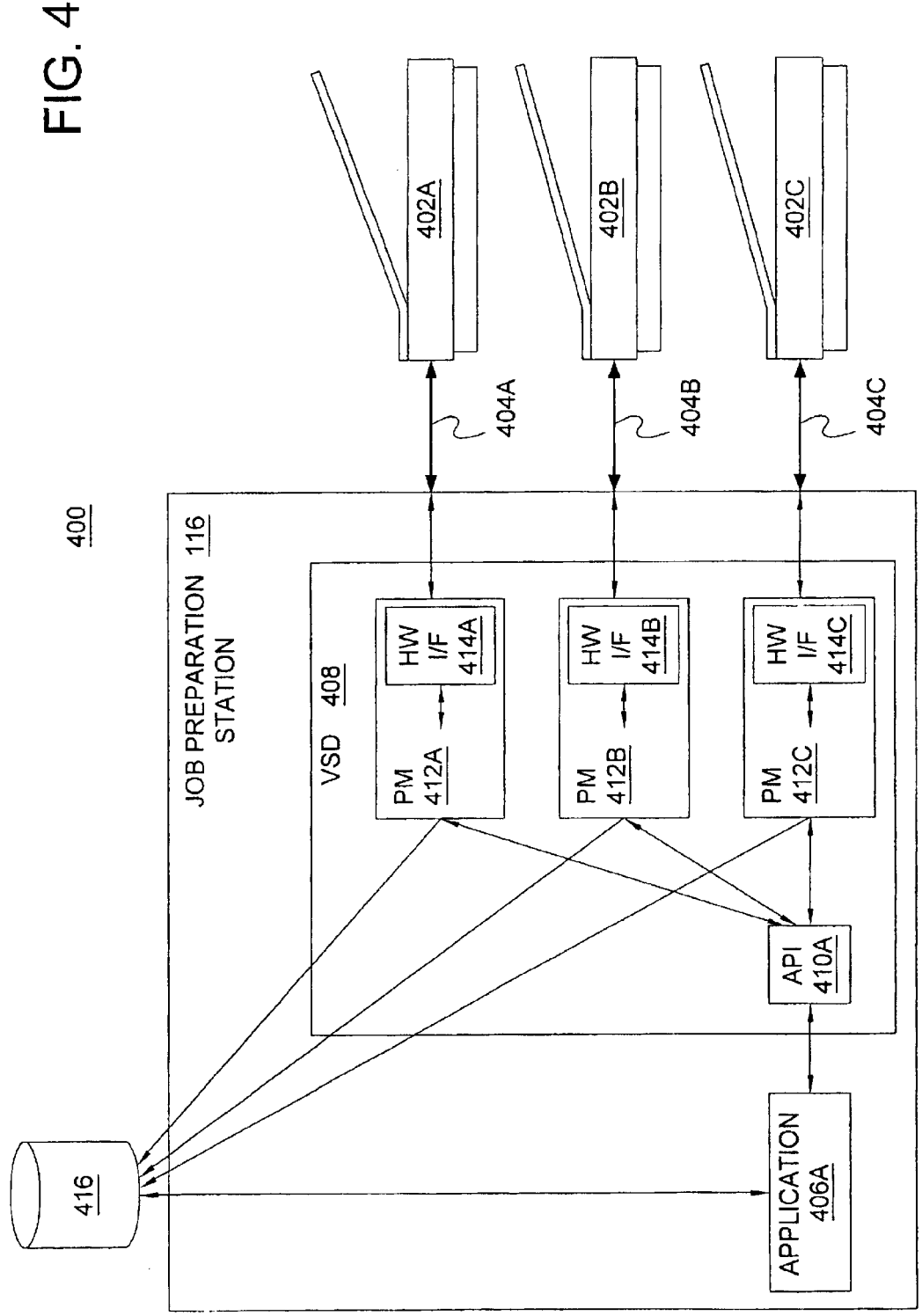
FIG. 4 depicts a block diagram of a scanner interface according to a second embodiment.

Referring now to FIG. 4 there is shown a block diagram of a second scanning system 400 utilizing a second embodiment of a VSD 408. This figure shows a scanning system 400 capable of simultaneously utilizing multiple scanners 402A–C. The scanning system 400 includes a job preparation workstation 116 coupled with scanners 402A–C using hardware interfaces 404A–C. It will be appreciated that each scanner 402A–C may be of a different type and may connect with the job preparation workstation 116 using a different hardware interface 404A–C as described above. Further, the scanning system 400 includes a commonly accessible buffer storage area 416, as described above, to allow the PM's 414A–C to deliver image data at the scanner's 402A–C rated speed and allow the scanning application 406 to asynchronously retrieve the image data without the need for handshaking.

FIG. 4 further shows PM's 414A–C coupled with the VSD API 410. These PM's 414A–C operate as described above for the embodiment of FIG. 3. Essentially, the scanning application 406 initiates scans on the scanners 402A–C by sending the appropriate commands to the VSD API 410. The API 410 then loads the appropriate PM's 412A–C for each scanner 402A–C. Each PM 412A–C can coexist and co-execute in a substantially parallel fashion with the other PM's 412A–C allowing simultaneous operation of the scanners 402A–C from the single scanning application 406 and VSD API 410. Further, the VSD API 410 and PM's 412A–C facilitate/enable the scanning application 406/workstation 116 to communicate with/operate and receive image data from one or more of the scanners 402A–C in real time as scans are progressing on those scanners 402A–C as described above. In alternative embodiments, such simultaneous scanning capability can be implemented by allowing multiple scanning applications 406 to execute and operate in a substantially parallel fashion on the job preparation workstation 116. Such multitasking is well known in the art. Further, the scanning application 406 can communicate with a single VSD API 408 with multiple PM's 412A–C controlling multiple scanners 402A–C as described or, alternatively, the VSD API 408 can, itself, be instantiated multiple times on the job preparation workstation 116 with each PM 412A–C.

In addition, appendices A–E are also included. Appendix A describes the interface specification of the VSD API in more detail. Appendix B describes the software architecture of the VSD in more detail. Appendix C describes the SCSI based user interface of the preferred scanner as implemented by the VSD PM. Appendix D describes the SCSI based diagnostic interface of the preferred scanner as implemented by the VSD PM.

Referring to Appendix, E, there is include computer code of an exemplary VSD and PM for the Preferred Imagedirect scanner. This code is intended to be compiled on a computer system comprising 64 Mb or more of random access memory, 20 GB or larger hard disk and a Pentium class processor, or better, manufactured by Intel Corporation, located in Santa Clara, Calif. as is known the art. Further, this code is intended to be compiled using Microsoft Visual Studio version 6.0 manufactured by Microsoft Corporation, located in Redmond, Wash. One of ordinary skill in the art will appreciate that the code files must be loaded into a directory structure as specified in pages 1–4 of the appendix. Once loaded, the make files must be executed as is known to compile and execute the VSD code.

It is therefore intended that the foregoing detailed description be regarded as illustrative rather than limiting, and that it be understood that it is the following claims, including all equivalents, that are intended to define the spirit and scope of this invention.

Appendix A

Virtual Scanner Driver Interface Specification

Introduction

The Virtual Scanner Driver (VSD) provides for access to scanning workflow within the environment of the Digital High Volume (DHV) product. The VSD provides this access via a generic and extensible interface to the underlying scanners. The purpose of the VSD is to allow clients to access multiple models and types of scanners without regard to the specific interfaces provided by each individual scanner.

Purpose

This document presents the interface to the VSD. The VSD provides the interface to scanning workflow within the DHV environment. This document describes the interface, including the operations and type definitions that it provides. This document also provides information regard access to and use of the interface by VSD clients.

Scope

This document describes the interface provided by the VSD, and describes the context in which it is used in the DHV environment. This includes details regarding the design and implementation of the VSD components where necessary to clarify the interface.

Audience

This document is intended to satisfy the needs of developers of client software that interfaces with the VSD. This document may also be useful to developers and maintainers of the scanner software and the VSD, and to project planners and management concerned with the functionality provided by the VSD.

Terms, Acronyms, and Abbreviations

This section defines terms, acronyms, and abbreviations used throughout this document.

TABLE 1

Definitions

| Term | Definition |
| --- | --- |
| DHV | Digital High Volume imaging device |
| VSD | Virtual Scanner Driver; provides the scanner interface to the DHV |
| SPM | Scanner Personality Module; provides the VSD access to functionality for a specific scanner |
| OMG | Object Management Group; originator of CORBA |
| CORBA | Common Object Request Broker Architecture; technology for location transparent method invocation on distributed object |
| ORB | Object Request Broker; CORBA component which manages connections between clients and servers |
| COM | Component Object Model; technology for location transparent access to distributed objects on a binary level, developed by Microsoft |
| IDL | Interface Definition Language; language for defining interfaces independent of implementation |

General Description

This section presents a high level description of the VSD interface. This includes discussion of the goals of the interface, the context in which it will be used, and an overview of its contents.

Interface Goals

The primary goal of the VSD interface is to provide a generic representation of scanning workflow to clients. The workflow is described by the operations provided by the VSD interface. Providing a generic representation allows arbitrary clients to communicate with any of the scanners configured for use with the VSD. Furthermore, many different scanners can be configured for use with the VSD without affecting client implementation.

A secondary goal of the VSD interface is extensibility in regard to the scanner settings and types supported. As the VSD evolves, the workflow, and thus the operations supported, will remain essentially the same. However, the number and types of scanner settings may change. This allows for new scanners with potentially new capabilities to be supported under the VSD, again without affecting existing client implementation.

Context

The VSD is designed to execute in the context of the DHV environment. The VSD interface exposes scanning workflow functionality to clients within this environment. Clients use this interface to connect with scanners and manage image capture via scan jobs.

The VSD resides on scan hosts within the DHV environment. For each scan host, a VSD will be installed to provide the interface for any connected scanners. Clients can utilize the VSD interface to access specific scanners connected to specific scan hosts. The DHV environment provides the mechanism by which clients discover scan hosts and the corresponding VSDs.

In order to gain access to each scanner on a scan host, the VSD communicates with the Scanner Personality Module (SPM) for that scanner. The SPM is a software component that exposes functionality for a particular scanner. The VSD interface wraps this scanner functionality into a generic and extensible representation. This allows clients to access scanners without regard to the specific scanner interface. This also allows for different scanners to be configured for use by the VSD and by its clients.

In addition to scanning workflow, the VSD arbitrates access to the scanner resources. The VSD interface explicitly enforces a serialization of scan jobs on a particular scanner via locking facilities. This ensures that only one client can run a scan job on a scanner at a particular time. In this way, the VSD allows multiple clients to access multiple scanners without contention.

Figure 5:
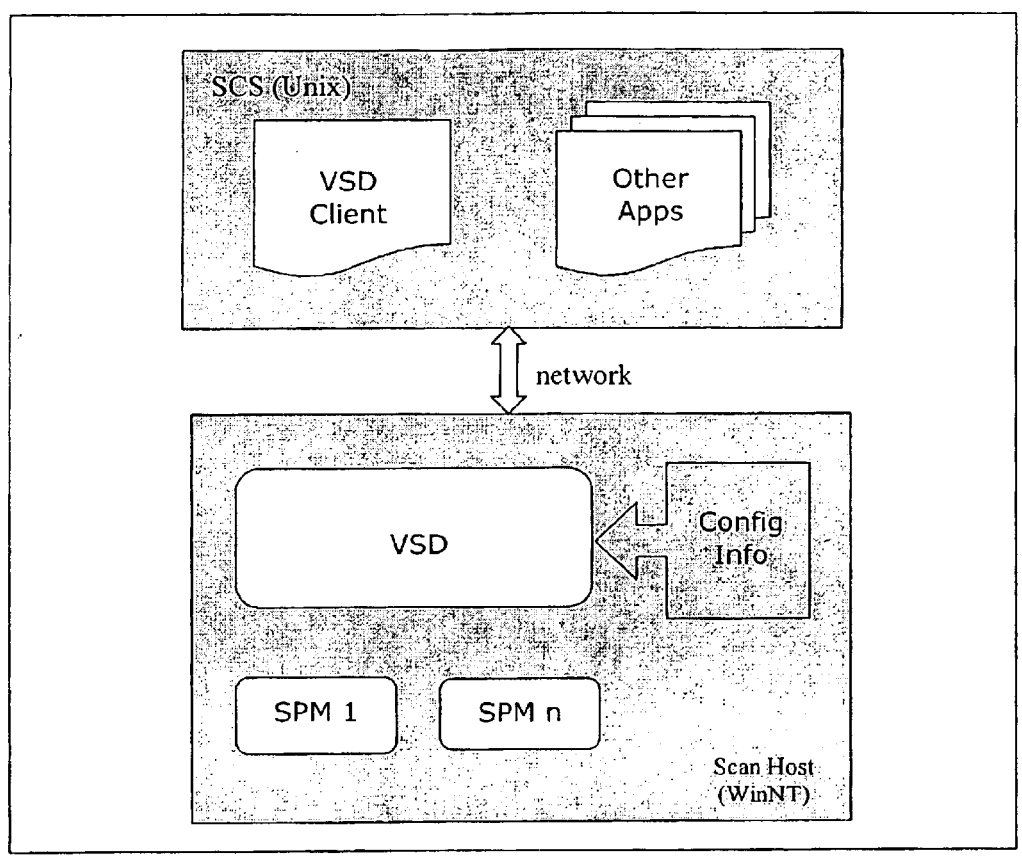
FIG. 5 depicts the interfacing of the VSD Clients, the VSD, and the SPMs.

FIG. 5 depicts the interfacing of the VSD Clients, the VSD, and the SPMs.

Usage Model

In order to access scanner functionality provided via the VSD interface, a client must first determine which scanners are available in the configuration. The client uses a scanner enumeration facility provided via the VSD interface to make this determination. This allows a client to identify an appropriate scanner.

TABLE 2

Scanner Enumeration

| Operation | Description |
| --- | --- |
| Enumerate Scanners | Retrieve a list of scanners connected to the scan host and configured for the VSD. |

After identifying a scanner, the client must register with the VSD to use that scanner. This allows the VSD to manage resources for the scanner, and to respond appropriately if a client is unexpectedly disconnected. When a client registers for a scanner, the VSD will start the SPM for the scanner if it has not been previously started (i.e. if no other client have yet registered). Upon registering for a scanner, the client will receive an indication of the state of the scanner. If the scanner has not been disabled, events generated by the scanner will be forwarded to the client. These events include status change indications and changes in the VSD tracked state of the scanner. Assuming that the scanner has not been disabled, the client may retrieve the initial status indications for the scanner via a VSD operation. Doing so allows the client to track the scanner status, with updates arriving via the generated events.

TABLE 3

Client Registration and Scanner Status

| Operation | Description |
| --- | --- |
| Register For Scanner | Register the client with the VSD for access to the scanner. |
| Get Status | Retrieve a list of status indicators for the scanner. |

To capture images in the appropriate format, the client must negotiate for scanner settings. This involves determining what settings a scanner supports, and setting the appropriate values for the desired image capture. This is accomplished via scanner setting operations provided through the VSD interface.

TABLE 4

Property Negotiation

| Operation | Description |
| --- | --- |
| Get Properties | Retrieve a list of scanner properties and their values. |
| Set Properties | Set new values for the indicated scanner properties. |

Once the proper scanning values are set, the client can proceed to capture images from the selected scanner. The client must first lock the scanner to obtain exclusive access. This ensures that clients do not collide in their attempts to use a particular scanner. When the client has obtained a lock on the scanner, it can begin capturing images. The client can control the image capture sequence by pausing and resuming the scanner as often as necessary. The client can also cancel an image capture, if so desired. The VSD interface provides operations to the client to enable scanner locking and image capture.

TABLE 5

Scanner Locking and Scanning

| Operation | Description |
|---|---|
| Lock Scanner | Obtain a lock on the scanner for exclusive access. |
| Start Scanning | Initiate a scan job on the scanner. |
| Pause Scanning | Pause the currently running scan job. |
| Cancel Scanning | Cancel a paused scan job. |

Alternatively, the client may elect to disable VSD access to the scanner, thus allowing access via a different mechanism (e.g. diagnostic software). Again, the client must first lock the scanner in order to preclude other clients from attempting to use the scanner while it is disabled. Having disabled a scanner, the client may subsequently re-enable and unlock the scanner. This allows the VSD to once again access the scanner, making it available for image capture in the system. The VSD interface provides operations to enable and disable scanners.

TABLE 6

Scanner Disable and Enable

| Operation | Description |
|---|---|
| Disable Scanner | Disable client access to the scanner, allowing access via a different mechanism (i.e. diagnostics). |
| Enable Scanner | Re-enable access to a previously disabled scanner. |

When a client has finished using a scanner, that client may release any locks on the scanner, and revoke its registration for that scanner. This allows the VSD to release scanner resources when clients are no longer interested in a scanner. The VSD interface provides unlocking and de-registering facilities for this purpose.

TABLE 7

Scanner Unlock and Unregister

| Operation | Description |
|---|---|
| Unlock Scanner | Relinquish the scanner lock to allow access by other clients. |
| Unregister For Scanner | Unregister the client, relinquishing access to the scanner. |

Dependencies

This section presents dependencies in regard to access and use of the VSD interface.

Client Access

In order to access VSD functionality, a client must be able to connect to the VSD interface. This includes locating the scan host for the VSD, and connecting to the software components that implement the interface. The DHV environment provides mechanisms for this purpose. In order to facilitate client connections, the VSD interface must be published in the DHV environment.

Scanner Access

In order to access the scanners connected to a scan host, the VSD must be able to identify and locate the SPM for each scanner. To facilitate this, the VSD requires configuration information regarding the connected scanners. This information must be accessible by the VSD within the scan host's operating environment.

Interface Description

This section presents the contents of the VSD interface, and describes the operations and types it provides. The VSD interface encompasses a number of operations that enable clients to interact with scanners and obtain images. The interface also includes a number of type definitions for the properties, status indicators, and events supported by the scanners.

Operations

The VSD interface defines operations to be implemented by the VSD components, and callback operations to be implemented by VSD clients. The interface also defines a number of exceptions to indicate errors that may occur during an operation.

VSD Operations

The VSD interface provides the following operations:

TABLE 8

VSD Operations

| | |
|---|---|
| Operation: | GetVersion |
| Description: | Allows a client to retrieve the version number of the VSD. |
| Parameters: | None |
| Returns: | VSD version number |
| Operation: | EnumerateScanners |
| Description: | Allows a client to retrieve a list of the scanners configured for the VSD installation. |
| Parameters: | None |
| Returns: | List of configured scanners |
| Operation: | RegisterForScanner |
| Description: | Allows a client to register to use a scanner. if the scanner is not disabled, this operation will enable event passing from the scanner to the client. |
| Parameters: | scannerID       Identifier of the scanner |
| | clientInterface  Interface to client |
| | scannerState   State of the scanner |
| Returns: | Unique key identifying the client session (sessionID) |
| Operation: | UnregisterForScanner |
| Description: | Allows a client to relinquish access to a scanner. This will result in the termination of any event passing between the scanner and the client. |
| Parameters: | scannerID  Identifier of the scanner |
| | sessionID   Session identifier key |
| Returns: | None |
| Operation: | GetProperties |
| Description: | Allows a client to retrieve scanner settings from the indicated scanner. |
| Parameters: | scannerID  Identifier of the scanner |
| | sessionID   Session identifier key |
| Returns: | List of properties for the scanner |
| Operation: | GetStatus |
| Description: | Allows a client to retrieve status information from the indicated scanner. |
| Parameters: | scannerID  Identifier of the scanner |
| | sessionID   Session identifier key |
| Returns: | List of status indicators for the scanner |
| Operation: | LockScanner |
| Description: | Allows a client to lock a scanner for exclusive access. A scanner must be locked prior to setting properties and initiating a scan. |
| Parameters: | scannerID  Identifier of the scanner |
| | sessionID   Session identifier key |
| Returns: | None |
| Operation: | ResetScanner |
| Description: | Allows a client to reset a scanner to its power on state. The client must have previously locked the scanner to execute this operation. |
| Parameters: | scannerID  Identifier of the scanner |
| | sessionID   Session identifier key |
| Returns: | None |
| Operation: | UnlockScanner |

TABLE 8-continued

VSD Operations

| | |
|---|---|
| Description: | Allows a client to unlock a previously locked scanner. |
| Parameters: | scannerID    Identifier of the scanner |
| | sessionID    Session identifier key |
| Returns: | None |
| Operation: | SetProperties |
| Description: | Allows a client to set values for the properties of the indicated scanner. The client must have previously locked the scanner in order to execute this operation. |
| Parameters: | scannerID    Identifier of the scanner |
| | sessionID    Session identifier key |
| | Properties   List of scanner properties to set |
| Returns: | None |
| Operation: | StartScanning |
| Description: | Allows a client to initiate scanning on the indicated scanner. The client must have previously locked the scanner in order to execute this operation. |
| Parameters: | scannerID    Identifier of the scanner |
| | sessionID    Session identifier key |
| Returns: | None |
| Operation: | PauseScanning |
| Description: | Allows a client to temporarily suspend scanning on a previously started scanner. |
| Parameters: | scannerID    Identifier of the scanner |
| | sessionID    Session identifier key |
| Returns: | None |
| Operation: | CancelScanning |
| Description: | Allows a client to cancel scanning on a previously started scanner. The scanner may have been paused prior to canceling the scan. |
| Parameters: | scannerID    Identifier of the scanner |
| | sessionID    Session identifier key |
| Returns: | None |
| Operation: | DisableScanner |
| Description: | Allows a client to disable access to a scanner. The client must have previously locked the scanner to execute this operation. |
| Parameters: | scannerID    Identifier of the scanner |
| | sessionID    Session identifier key |
| Returns: | None |
| Operation: | EnableScanner |
| Description: | Allows a client to re-enable a previously disabled scanner. |
| Parameters: | scannerID    Identifier of the scanner |
| | sessionID    Session identifier key |
| Returns: | None |

Client Operations

The VSD requires a callback through which it communicates event information to its client. This callback is provided on the interface that is passed to the client registration operations, above. A VSD client must implement this interface to enable connection to the VSD. The callback definition is as follows:

TABLE 9

VSD Event Callback

| | |
|---|---|
| Operation: | EventCallback |
| Description: | Allows the VSD to pass event information from a scanner to a registered client. |
| Parameters: | Event    Event information from the scanner |
| Returns: | None |

Exceptions

The VSD may generate exceptions in response to operations invoked by the client. An exception returned by an operation indicates that the operation could not be completed successfully. A particular exception may indicate that the client passed poorly formed operation parameters or property settings, or that the scanner is in a state where the operation cannot be executed. The VSD may generate the following exceptions:

TABLE 10

VSD Exceptions

| | |
|---|---|
| Exception: | Bad Scanner ID |
| Description: | Indicates that the client passed an unrecognized scanner ID.. |
| Exception: | Bad Session ID |
| Description: | Indicates that the client passed an invalid session ID. |
| Exception: | Bad Event Interface |
| Description: | Indicates that the client provided poorly formed or null interface during event registration. |
| Exception: | Bad Lock Session |
| Description: | Indicates that the client attempted an operation requiring a lock on the scanner without previously locking the scanner. |
| Exception: | Scanner Locked |
| Description: | Indicates that the client attempted to lock a scanner that is already locked. |
| Exception: | Scanner Busy |
| Description: | Indicates that the scanner is processing a job and cannot support the attempted operation at this time. |
| Exception: | Scanner Disabled |
| Description: | Indicates that the scanner has been disabled, and cannot support the attempted operation at this time. |
| Exception: | Scanner Error |
| Description: | Indicates that the scanner has experienced an unrecoverable error, and that no functionality is available from this scanner. |
| Exception: | Bad Property ID |
| Description: | Indicates that the client passed a property ID that is not recognized by the scanner. |
| Exception: | Bad Property Value |
| Description: | Indicates that the client passed a value that is not supported for the corresponding property on the scanner. |
| Exception: | Bad Property Type |
| Description: | Indicates that the client passed a value of a type that is not supported by the corresponding property on the scanner. |

Types

The VSD interface supports the type definitions for property, status indicator, and event identifiers. The interface also defines manifest values related to property settings and states.

Properties

The VSD interface supports the following properties:

TABLE 11

Scanner Properties

| | |
|---|---|
| Property: | X Resolution |
| Description: | Resolution of the image along the x-axis |
| Values: | Resolutions in dots-per-inch (dpi) |
| Property: | Y Resolution |
| Description: | Resolution of the image along the y-axis |
| Values: | Resolutions in dpi |
| Property: | Paper In Track |
| Description: | Size of paper in feed direction |
| Values: | Paper sizes in pixels |
| Property: | Paper Cross Track |
| Description: | Size of paper across feed direction |
| Values: | Paper sizes in pixels |
| Property: | Left Margin Front |
| Description: | Position of left margin on front side of page |
| Values: | Margin position in pixels |
| Property: | Right Margin Front |
| Description: | Position of right margin on front side of page |
| Values: | Margin position in pixels |
| Property: | Top Margin Front |
| Description: | Position of top margin on front side of page |
| Values: | Margin position in pixels |
| Property: | Bottom Margin Front |
| Description: | Position of bottom margin on front side of page |
| Values: | Margin position in pixels |
| Property: | Left Margin Back |
| Description: | Position of left margin on back side of page |
| Values: | Margin position in pixels |
| Property: | Right Margin Back |

TABLE 11-continued

Scanner Properties

| | |
|---|---|
| Description: | Position of right margin on back side of page |
| Values: | Margin position in pixels |
| Property: | Top Margin Back |
| Description: | Position of top margin on back side of page |
| Values: | Margin position in pixels |
| Property: | Bottom Margin Back |
| Description: | Position of bottom margin on back side of page |
| Values: | Margin position in pixels |
| Property: | Original Sides |
| Description: | Sides of page scanned from original |
| Values: | Simplex |
| | Duplex, Flip Short Side |
| | Duplex, Flip Long Side |
| Property: | Auto Size |
| Description: | Locale used for auto paper size function |
| Values: | No Auto Size |
| | US Paper Sizes |
| | European Paper Sizes |
| Property: | Data Orientation |
| Description: | Orientation of data on the page |
| Values: | Portrait |
| | Landscape |
| Property: | Rotation |
| Description: | Rotation angle of image on the page |
| Values: | Angle of rotation in degrees |
| Property: | Crop Method |
| Description: | Method used to crop the original image |
| Values: | Crop |
| | Edge Erase |
| Property: | X Scale Factor |
| Description: | Image scaling along the x-axis |
| Values: | Scaling percentage |
| Property: | Y Scale Factor |
| Description: | Image scaling along the y-axis |
| Values: | Scaling percentage |
| Property: | Original Type |
| Description: | Type of original image |
| Values: | Normal |
| | Text and Line |
| | Coarse Halftone |
| | Fine Halftone |
| | Photo |
| Property: | Darkness |
| Description: | Adjustment to overall darkness (amount of black) in the scanned image data |
| Values: | Level of darkness adjustment |
| Property: | Contrast |
| Description: | Adjustment to the difference between light and dark areas of the scanned image data |
| Values: | Level of contrast adjustment |
| Property: | Sharpness |
| Description: | Adjustment to adjacent lights and darks in the scanned image data for the enhancement of edge definition |
| Values: | Level of sharpness adjustment |
| Property: | Highlight |
| Description: | Adjustment to light areas of scanned image data |
| Values: | Level of highlight adjustment |
| Property: | Midtone |
| Description: | Adjustment to medium gray areas of scanned image data |
| Values: | Level of midtone adjustment |
| Property: | Shadow |
| Description: | Adjustment to dark areas of scanned image data |
| Values: | Level of shadow adjustment |
| Property: | Halftone |
| Description: | Halftone adjustment to scanned image data |
| Values: | Level of halftone adjustment |
| Property: | Light Text |
| Description: | Adjustment to scanned image data for reproduction clarity of light text originals |
| Values: | Level of light text adjustment |
| Property: | Reduced Moire |
| Description: | Adjustment to reduce moire effect from image noise |
| Values: | Level of adjustment for moire reduction |
| Property: | Reduced Paste Up |
| Description: | Adjustment to reduce paste-up shadows when two or more originals are used to compose a single image |
| Values: | Level of adjustment for paste-up reduction |

TABLE 11-continued

Scanner Properties

| | |
|---|---|
| Property: | Filter Background |
| Description: | Adjustment to reduce original background (e.g. paper color) to distinguish the image |
| Values: | Level of background filter |
| Property: | Image Reverse |
| Description: | Reverse scanned image |
| Values: | True or False |
| Property: | Despeckle |
| Description: | Despeckle scanned image |
| Values: | True or False |
| Property: | Speckle Size |
| Description: | Nominal speckle size used in despeckling |
| Values: | Speckle size in pixels |
| Property: | Character Protection |
| Description: | Enable character protection when despeckling the scanned image |
| Values: | True or False |
| Property: | Deskew |
| Description: | Deskew the scanned image |
| Values: | True or False |
| Property: | Sample Per Pixel |
| Description: | Number of data samples for each pixel in the scanned image |
| Values: | Number of samples |
| Property: | Bits Per Sample |
| Description: | Number of bits for each data sample |
| Values: | Number of bits |
| Property: | Scan Mode |
| Description: | Mode for scanning originals |
| Values: | Single Page |
| | Batch |
| Property: | Image Destination |
| Description: | Destination of image on the host |
| Values: | URL indicating destination |
| Property: | Image Number |
| Description: | Starting number for numbered images at image destination |
| Values: | Initial image number |
| Property: | Output Format |
| Description: | Format of the image output at the image destination |
| Values: | Raw data |
| | TIFF with no compression |
| | TIFF, Group 3 compressed |
| | TIFF, Group 4 compressed |
| | JFIF (JPEG compressed) |
| Property: | Compression |
| Description: | Compression scheme for transferred image data |
| Values: | No compression |
| | Group 3 |
| | Group 4 |
| | Packbits |
| | LZW |
| | JPEG |
| Property: | Page Order |
| Description: | Ordering of output pages |
| Values: | 1 to N |
| | N to 1 |
| Property: | Photometric Interpretation |
| Description: | Format for image data interpretation |
| Values: | White 0 |
| | White 1 |
| | RGB |
| | BGR |
| | Palette |

Status Indicators

The VSD interface supports the following status indicators:

TABLE 12

Scanner Status

| | |
|---|---|
| Status Indicator: | Virtual Scanner Status |
| Description: | Status of the virtual scanner |

TABLE 12-continued

Scanner Status

| | |
|---|---|
| Values: | Idle |
| | Locked |
| | Scanning |
| | Paused |
| | Disabled |
| | Error |
| Status Indicator: | Scan Device Status |
| Description: | Status of the scan device |
| Values: | Offline |
| | Online |
| Status Indicator: | Feeder Status |
| Description: | Status of Automatic Document Feeder on scan device |
| Values: | Feeder not present |
| | Feeder empty |
| | Feeder loaded |
| Status Indicator: | Cover Status |
| Description: | Status of the cover on the scan device |
| Values: | Closed |
| | Open |
| Status Indicator: | Communications Status |
| Description: | Status of the communication channel from the host to the scan device |
| Values: | Not ready |
| | Ready |
| Status Indicator: | Paper Path Status |
| Description: | Status of the paper path on the scan device |
| Values: | Paper path clear |
| | Paper jam |

Events

The VSD interface supports the following events:

TABLE 13

Events

| | |
|---|---|
| Event: | Heartbeat |
| Description: | Indicates that the VSD and scanning software are functional. |
| Event: | Status Changed |
| Description: | Indicates that a status indication has changed. |
| Event: | End of Page |
| Description: | Indicates that a complete page has been scanned and written to the image destination area. |
| Event: | End of Job |
| Description: | Indicates that the scan job has completed successfully. |
| Event: | End of Job Error |
| Description: | Indicates that the scan job has ended prematurely due to an error. |
| Event: | Start Button Pressed |
| Description: | Indicates that the start button on the scan device was pressed. |
| Event: | Stop Button Pressed |
| Description: | Indicates that the stop button on the scan device was pressed. |

Implementation Considerations

This section presents details regarding the implementation of the VSD interface. This includes descriptions of the technologies utilized by components of the VSD, as well as a discussion of the target environment in which the VSD will execute.

Architecture

The VSD architecture encompasses components designed for both CORBA and COM. At each level in the architecture, components supply interfaces to their clients. These interfaces are specific implementations of the interface described in this document.

CORBA

The VSD provides a CORBA interface at the top level. This interface allows CORBA clients to access the functionality implemented by the VSD and the underlying scan software. Access to this interface is arbitrated by an Object Request Broker (ORB), which provides for the location transparent method invocation mechanism that is central to CORBA.

In order to make the VSD functionality available to clients, the ORB needs to be able to locate the VSD implementation. To facilitate this, the VSD will be registered with the ORB. This allows clients to use ORB services to bind to the VSD and access its interface. In this scenario, the VSD acts as a CORBA server.

The actual CORBA server component of the VSD will act as a proxy to the underlying COM component described in the next section. This means that the CORBA component does little more than forward operations to the COM component, performing any necessary CORBA to COM data translation along the way.

COM

As stated above, the CORBA layer of the VSD interacts with a COM component. This component implements the full VSD interface, and interacts with the SPMs to achieve the requisite functionality. Having the COM component implement the entire interface is advantageous in that COM clients (foregoing the CORBA layer) can be supported on the interface.

The COM component is made available to clients by publishing COM specific object and interface information to the system registry. This allows COM clients, such as the CORBA to COM proxy layer, to access the VSD functionality using standard COM idioms.

Environment

The VSD is targeted as a component of the DHV software. The DHV supports the installation of a scanner via connection to a scanner workstation. This scanner workstation provides the operating environment for the VSD and the SPMs. The operating environment is Windows NT.

Execution

As discussed in the previous section, VSD functionality is made available to clients at the top level via the CORBA ORB. The ORB allows clients to bind to the VSD implementation, and access the interface. This binding operation provides the mechanism by which the VSD executable code will be started. When the first VSD client in the system attempts a bind, the ORB will cause the VSD to begin executing. Once started, the VSD will configure itself, and begin serving clients.

Configuration

The VSD requires configuration information in order to determine the installed scanners on the scanner workstation. This information allows the VSD to determine which scanners are connected to the workstation, and which software modules specifically support those scanners. Since the VSD runs in an NT environment, its configuration information will be stored in the NT system registry. Upon initialization, the VSD will consult the registry to determine its configuration, and use this information to start the necessary software components. Once this configuration step is complete, the VSD and the underlying components will be functional.

Appendix B

Virtual Scanner Drive Software Architecture

Introduction

The Virtual Scanner Driver (VSD) provides for access to scanning workflow within the environment of the Digital High Volume (DHV) product. The VSD provides this access via a generic and extensible interface to the underlying scanners. The purpose of the VSD is to allow clients to access multiple models and types of scanners without regard to the specific interfaces provided by each individual scanner.

Purpose

This document presents the architecture of the VSD. The VSD is composed of a number of software components that work together to provide the requisite functionality. This document provides information regarding the structure and interaction of these components. This includes a discussion of the tools and technologies used to connect and provide access to these components.

Scope

This document is concerned with the architecture of the VSD. This document presents the software components making up the VSD, their interaction, and the mechanisms by which these components are accessed. Details as to the implementation of these components are also included, where necessary to clarify the architecture.

Audience

This document is intended for software developers and maintainers concerned with the overall architecture of the VSD. This document may also be useful to developers of specific VSD clients and of specific scanner components, and to project planners and management concerned with the functionality provided by the VSD.

Terms, Acronyms, and Abbreviations

TABLE 14

Definitions

| Term | Definition |
|---|---|
| DHV | Digital High Volume imaging device |
| VSD | Virtual Scanner Driver; provides the scanner interface to the DHV |
| SPM | Scanner Personality Module; provides the VSD access to functionality for a specific scanner |
| CORBA | Common Object Request Broker Architecture; technology for location transparent method invocation on distributed object |
| ORB | Object Request Broker; CORBA component which manages connections between clients and servers |
| COM | Component Object Model; technology for location transparent access to distributed objects on a binary level, developed by Microsoft |

Architecture Overview

This section provides a top-level overview of the architecture of the VSD. This includes a look at the overall DHV environment, and an enumeration of the software components making up the VSD.

DHV Environment

The VSD is designed to execute in the context of the DHV environment, exposing scanning workflow to clients within this environment. The DHV environment contains collection of components running under Unix and Windows NT operating environments.

The primary DHV components include a number of Unix applications providing for the majority of the product functionality. This includes those components that manage print, scan, and copy jobs. Generally, components within this group communicate via an Object Request Broker (ORB) supporting the Common Object Request Broker Architecture (CORBA). The VSD client for the DHV resides among these components, and uses the ORB to communicate with the VSD.

The components that provide scanning support for the DHV product are Windows NT based components residing on Scan Hosts. These components generally intercommunicate using Component Object Model (COM) support provided by the NT environment. These components may also be CORBA enabled to support communication with other DHV components. The VSD resides in the NT environment, and uses both CORBA and COM methods for communication with other components.

High Level Architecture

Scanning workflow in the DHV environment is supported essentially by three component classes. These include VSD Clients, the VSD itself, and a number of Scanner Personality Modules to support different scanners.

The VSD Client component communicates with the VSD to enable scanning workflow for the DHV. This component utilizes VSD functionality to gain access to scanners, and to manage scan jobs on these scanner for image capture. It is the client's responsibility to locate the networked scan hosts and to initiate communication with the VSD via the ORB.

The VSD is the component that provides functionality to enable scanning workflow for the DHV. This functionality is exposed through a generic and extensible interface. It is via this interface that clients utilize the VSD for scanning tasks. To support different models and types of scanners, the VSD utilizes the Scanner Personality Modules (SPMs) for the scanners connected to the scan host. Each SPM manages a particular scanner, providing support for image capture via scan jobs.

A Scanner Personality Module (SPM) is a component that provides support for a particular model and type of scanner. This component handles all direct interaction with the scanner, typically via a SCSI interface. To expose its functionality, the SPM provides a software interface. This interface enables management of scan jobs, scanner status reporting, event propagation, and any other functionality necessary to support image capture from the scanner.

Figure 6:
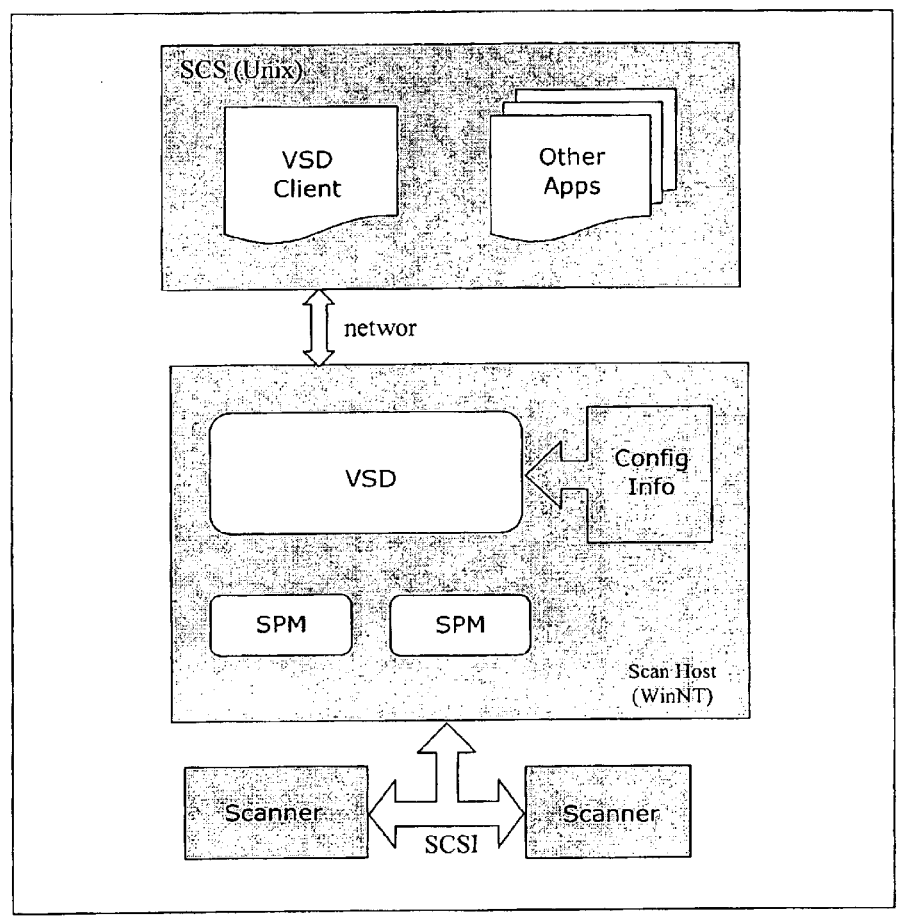
FIG. 6 depicts the context of the VSD in the DHV environment.

FIG. 6 shows the context of the VSD in the DHV environment.

VSD Component Architecture

This section describes the component architecture of the DHV scanning subsystem. This includes the presentation of the component architecture of the VSD itself. This also includes pertinent information regarding supporting components, such as VSD clients and SPMs, and the mechanisms by which these components interact with the VSD.

VSD Components

The VSD consists of a CORBA component and a COM component. These components work together to provide access to scanners for VSD clients.

CORBA to COM Proxy

At the top level, the VSD exposes a CORBA interface to its clients. This interface is exposed by component of the VSD that acts as a CORBA server. This implies access by the ORB, requiring that this component be registered within the CORBA environment. Registration with the ORB provides the means by which CORBA clients bind to the VSD, and facilitates location transparent method invocation. In short, the CORBA server component provides CORBA connectivity to the VSD.

The CORBA component of the VSD acts as a proxy to the underlying COM object. This component forwards method invocation to the COM component, performing the requisite CORBA to COM data type translations. This component also enables CORBA exception processing, in the event of errors when processing a method invocation. Finally, this component enables event passing through the client interface implemented by VSD clients.

VSD COM Object

The COM component of the VSD architecture facilitates access to scanners in the NT environment. This component implements the full VSD functionality, enabling scanner workflow completely in the COM environment. In this respect, this component acts as a COM server, supporting clients such as the top level CORBA component. This requires registration with the COM subsystem of the NT environment. Registration of this component allows for access to the underlying functionality using standard COM idioms.

The VSD COM object provides scanner configuration information to its clients via the VSD interface. This information describes the scanners connected to the local scan host, allowing clients to select a scanner to access. Scanner configuration information is stored locally on the scan host, in the NT system registry. The VSD COM object utilizes this configuration store to provide the requisite information to its clients.

Having provided the means to access a scanner, the VSD COM object must provide the actual scanner connection to its clients. The COM component accomplishes this through the use of the SPMs for each of the configured scanners. The VSD COM object will load the SPM for a particular scanner to provide access to that scanner. Scanning workflow operations are then routed to the SPM by the VSD based on client requests. Finally, when access to the scanner is no longer required, the VSD unloads the SPM. In this way, the VSD COM component manages resources to allow its clients access to scanners on an as needed basis.

Supporting Components

To fully enable image capture for the DHV, the VSD interacts with both SPMs and VSD clients. These components complete support for scanning workflow, with the clients driving the process, and the SPMs providing scanner connectivity.

VSD Client

The VSD client drives the image capture process, utilizing the VSD to access scanners and manage scan jobs. For the purposes of the DHV, the clients are CORBA clients existing within the DHV environment. As such, these clients must register with the ORB in a similar fashion to the VSD CORBA server.

In order to access the VSD, the client must locate the appropriate scan host and the corresponding VSD implementation. In the CORBA lexicon, this involves binding to the VSD CORBA server. Once a client has bound to the VSD, it may begin accessing VSD methods.

In order to utilize a particular scanner for image capture, the client must register with the VSD for that scanner. In doing so, the client provides an interface to enable callbacks from the VSD. The client implements this interface in order to facilitate event passing, as called for in the VSD interface. In this way, bi-directional communication is established between the client and the VSD.

Scanner Personality Modules

Scanner Personality Modules provide direct communication to scanners connected to the scan host. SPMs are COM objects running in the context of the NT operating environment on the scan host. These components are managed by the VSD to satisfy its client's requests for scanner access. To allow access to the SPMs by the VSD, these components must be registered with the COM subsystem of the NT environment. Registration allows for access to these components via standard COM idioms.

To effectively provide scanner functionality, an SPM must be associated with the appropriate scanner on the scan host. This effectively means that the VSD must be able to identify the SPM using the configuration information that describes the connected scanners. This is accomplished by including SPM configuration information along with the scanner entries in the NT system registry for the scan host.

Figure 7:
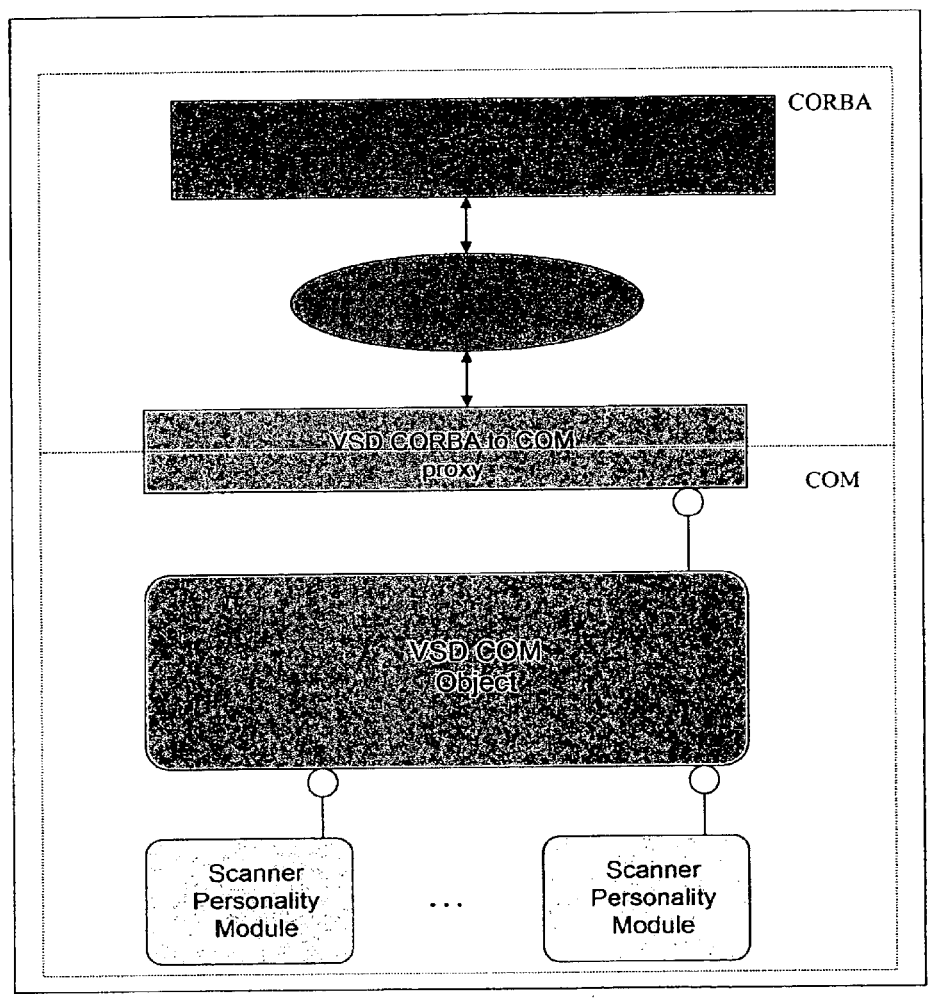
FIG. 7 depicts the high-level architecture of the VSD components.

FIG. 7 presents the high-level architecture of the VSD components.

Architectural Dependencies

This section presents dependencies of the VSD architecture. This includes information regarding services and components necessary to support the execution of the VSD.

CORBA daemon

For the purposes of the DHV, the VSD acts as a CORBA server to its clients. To expose functionality via CORBA, the VSD requires support from the CORBA architecture. This support is provided by the CORBA daemon. The CORBA daemon is the component that provides for execution and connectivity to CORBA objects on its host system. Thus, the VSD depends on the execution of the CORBA daemon on the scan host.

CORBA Server Registration

To obtain the support of the CORBA daemon, CORBA objects must be registered on the host system. Doing so allows the CORBA daemon to associate interfaces with objects, and to provide binding services to object clients. To obtain CORBA support, the VSD requires registration of the appropriate CORBA object and interfaces.

ORB Execution

The CORBA daemon must be executed on the host system to provide connectivity to CORBA objects at runtime. The daemon process provides ORB services to connect clients to objects via CORBA interfaces. For the purposes of the DHV environment, the ORB runs in the context of the daemon process.

To ensure that CORBA services are available, the CORBA daemon must running prior to any attempts by clients to bind to objects. Typically, the CORBA daemon is started when the host system is booted up. Thus, in the NT environment of the scan host, the CORBA daemon runs as an NT service, started at boot time.

COM Support

While the VSD provides a CORBA interface to its clients, the underlying functionality is implemented via COM. COM idioms are used by the VSD to provide support to the CORBA layer, and to connect to the SPMs. Thus, the VSD depends on the COM subsystem built into the NT environment on the scan host.

COM Server Registration

To obtain support from the COM subsystem, COM objects must be registered on the host system. COM object registration is achieved by writing a number of entries to the NT system registry. Depending on the implementation of the object, it may be capable of self- registration (e.g. an EXE server). Otherwise, system tools can be used to register the object and its interfaces (e.g. for a DLL server). To provide services via COM, the VSD requires registration with the COM subsystem on the scan host.

I claim:

1. A driver for interfacing a first application program to first and second scanners, said first application program operative to transmit first and second commands to said first and second scanners and said first and second scanners operative to scan first and second documents and transmit first and second image data and first and second status data from said scans to said first application program, said driver comprising:

an application program interface ("API") coupled with said first application program and operative to receive said first commands from said first application program;

a first scanner personality module ("SPM") coupled with said API and said first scanner and operative to receive said first image data and said first status data from said first scanner and transmit said first commands to said first scanner and provide said first image data and said first status data to said first application program;

a second scanner personality module ("SPM") coupled with said API and said second scanner and operative to receive said second image data and said second status data from said second scanner and transmit said second commands to said second scanner and provide said second image data and said second status data to said first application program and wherein said second SPM is further capable of operating substantially simultaneously with said first SPM; and wherein said API and said first and second SPM's facilitate real time communication between said first application program and said first and second scanners.

2. The driver of claim 1, wherein said first scanner is of a first type, said first SPM being associated with said first type and said second scanner is of a second type, said second SPM being associated with said second type.

3. The driver of claim 1, wherein said first and second SPM's are further operative to simultaneously receive said first and second image data and said first and second status data from said first and second scanners while transmitting said commands to said first and second scanners.

4. The driver of claim 1, wherein said first and second SPM's are further operative to provide said first and second image data to a buffer asynchronously accessible by said first application program.

5. The driver of claim 4, wherein said buffer comprises a hard disk.

6. The driver of claim 1, wherein said first and second SPM's are further operative to substantially simultaneously transmit said first and second commands to said first and second scanners while said scans are in progress.

7. The driver of claim 6, wherein said commands comprise commands to adjust scan quality.

8. A system implemented in a computer workstation for interfacing one or more application programs executing on said workstation to at least two scanners coupled with said workstation, each of said at least two scanners comprising a scanner interface, said system comprising:

A first module operative to receive commands from said one or more application programs and provide image data and status data to said one or more application programs;

A second module coupled with said first module and associated with a first of said at least two scanners, said second module being coupled with said scanner interface of said first of said at least two scanners and operative to receive said commands from said first module and translate said commands to said scanner interface, said second module further operative to receive image data and status data from said first of said at least two scanners via said scanner interface and transmit said image data and said status data to said first module; and wherein said second module is capable of translating said commands to said scanner interface and receiving said image data and said status data while a scan is in progress on said first of said at least two scanners; and wherein said first module is capable of receiving said commands from said one or more application programs and providing said image data and said status data to said one or more application programs while a scan is in progress on said first of said at least two scanners.

9. The system of claim 8, wherein said first module is further operative to provide a uniform interface to all of said one or more applications.

10. The system of claim 8, wherein said scanner interface further comprises a hardware interface and a software interface.

11. The system of claim 8, wherein said commands comprise commands to readjust a scan in progress.

12. The system of claim 11, wherein said commands comprise commands to readjust scan quality of said scan in progress.

13. The system of claim 8, further comprising:

a third module coupled with said first module and associated with a second of said at least two scanners, said third module being coupled with said scanner interface of said second of said at least two scanners and operative to receive commands from said first module and translate said commands to said scanner interface, said third module further operative to receive image data and status data from said second of said at least two scanners via said scanner interface and transmit said image data and said status data to said first module; and wherein said second module is capable of translating said commands to said scanner interface and receiving said image data and said status data while scans are in progress on said first and second of said at least two scanners.

14. The system of claim 8, further comprising a buffer, said buffer capable of being asynchronously accessed by said one or more application programs and wherein said first module is further operative to store said image data in said buffer.

15. The system of claim 14, wherein said buffer comprises a hard disk.

16. A method of interfacing a first application program to first and second scanners, said first application program executing on a first computer coupled with said first and second scanners, said method comprising:

(a) initiating a first scan of a first document on said first scanner as directed by said first application program;

(b) initiating a second scan of a second document on said second scanner as directed by said first application program, as said first scan progresses;

(c) receiving first image data generated by said first scan as said first and second scans progress;

(d) receiving first status data from said first scanner as said first and second scans progress;

(e) receiving second image data generated by said second scan as said first and second scans progress;

(f) receiving second status data from said second scanner as said first and second scans progress;

(g) providing said first image data and said first status data to said first application program as said first and second scans progress;

(h) providing said second image data and said second status data to said first application program as said first and second scans progress;

(i) adjusting said first scan as said first and second scans progress; and (j) adjusting said second scan as said first and second scans progress.

17. The method of claim 16, wherein (e) further comprises adjusting said first scan based on said received first image data and said received first status data.

18. The method of claim 17, wherein (i) and (j) further comprise adjusting said first and second scans as directed by said first application program.

19. The method of claim 18, wherein said adjusting is automatic.

20. The method of claim 16, wherein (i) and (j) further comprise adjusting an imaging algorithm of said first scanner.

21. The method of claim 16, wherein (i) and (j) further comprise adjusting the imaging resolution of said first scanner.

22. The method of claim 16, wherein (i) and (j) further comprise adjusting the bit depth of said first scanner.

23. The method of claim 16, wherein (g) and (h) further comprise providing said first and second image data to a buffer area accessible by said first application program.

24. The method of claim 23, wherein said storage area comprises a hard drive.

25. The method of claim 23., wherein said buffer area is asynchronously accessible by said first application program.

26. The method of claim 16, wherein said first and second scans progress at a rate of approximately 65 pages per minute.

27. The method of claim 16, wherein:
  (a) further comprises receiving in a first module a first one or more generic commands generated by said first application program to initiate said first scan, transmitting said first one or more generic commands to a second module coupled with said first module, translating said first one or more generic commands into a first one or more specific commands in said second module and transmitting said first one or more specific commands from said second module to said first scanner;
  (b) further comprises receiving in said first module a second one or more generic commands generated by said first application program to initiate said second scan, transmitting said second one or more generic commands to a third module coupled with said first module, translating said second one or more generic commands into a second one or more specific commands in said third module and transmitting said second one or more specific commands from said third module to said second scanner;
  (c) further comprises receiving said first image data by said second module;
  (d) further comprises receiving said second image data by said third module;
  (e) further comprises receiving said first status data by said second module and transmitting said first status data from said second module to said first module;
  (f) further comprises receiving said second status data by said third module and transmitting said second status data from said second module to said first module; and
  (g) further comprises transmitting said first image data to said first application program from said second module and said first status data to said first application program from said first module; and
  (h) further comprises transmitting said second image data to said first application program from said third module and said first status data to said first application program from said first module.

28. The method of claim 27, wherein said third module is coupled with said first module in place of said second module.

29. The method of claim 27, wherein said third module is coupled with said first module simultaneously with said second module.

* * * * *